(12) United States Patent
Jensen et al.

(10) Patent No.: US 11,619,491 B2
(45) Date of Patent: Apr. 4, 2023

(54) RETROREFLECTORS

(71) Applicant: HEXAGON TECHNOLOGY CENTER GMBH, Heerbrugg (CH)

(72) Inventors: Thomas Jensen, Rorschach (CH); Zheng Yang, Friedrichshafen (DE); Andreas Schwendener, Chur (CH); Danick Brühlmann, Staad (CH); Josef Müller, Oberegg (CH); Johan Stigwall, St. Gallen (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 202 days.

(21) Appl. No.: 16/914,289

(22) Filed: Jun. 27, 2020

(65) Prior Publication Data
US 2020/0408520 A1   Dec. 31, 2020

(30) Foreign Application Priority Data

Jun. 27, 2019 (EP) .................................. 19182962
Dec. 19, 2019 (EP) .................................. 19217975

(51) Int. Cl.
*G01C 15/00* (2006.01)
*G02B 5/124* (2006.01)
*G02B 3/06* (2006.01)

(52) U.S. Cl.
CPC .......... *G01C 15/004* (2013.01); *G02B 5/124* (2013.01); *G02B 3/06* (2013.01)

(58) Field of Classification Search
CPC ...... G01C 15/004; G01C 15/002; G02B 3/06; G02B 5/124
(Continued)

(56) References Cited

U.S. PATENT DOCUMENTS 6,667,798 B1   12/2003   Markendorf et al.
7,583,373 B2   9/2009   Schwarz
(Continued)

FOREIGN PATENT DOCUMENTS

DE           103 21 749 A1   12/2004
DE      10 2012 011518 B3   10/2013
(Continued)

OTHER PUBLICATIONS

JP 4293484 translation, 10 pp. (Year: 2022).*
(Continued)

*Primary Examiner* — Daniel L Murphy
(74) *Attorney, Agent, or Firm* — Maschoff Brennan

(57) ABSTRACT

A reflector arrangement for determining the position or marking of target points, having at least one retroreflector, and a beam detection unit, by means of which the orientation measurement radiation passing through the retroreflector is acquirable. The beam detection unit comprises a first sensor for generating a signal in dependence on an acquisition of orientation measurement radiation and a first beam guiding unit. The first sensor and the first beam guiding unit are arranged such that a detection field of view for acquiring the orientation measurement radiation is defined, an alignment of the detection field of view around the yaw axis is variable and orientation measurement radiation passing through the retroreflector is acquirable in dependence on the alignment of the detection field of view with the first sensor.

18 Claims, 13 Drawing Sheets

(58) Field of Classification Search
USPC .......................................... 356/152.3
See application file for complete search history.

(56) References Cited

U.S. PATENT DOCUMENTS

| | | |
|---|---|---|
| 10,054,439 B2 | 8/2018 | Jensen et al. |
| 2004/0223139 A1 | 11/2004 | Vogel |
| 2013/0329218 A1 | 12/2013 | Vogel |

FOREIGN PATENT DOCUMENTS

| | | | |
|---|---|---|---|
| EP | 1 200 853 A1 | 5/2002 | |
| EP | 1 686 350 A1 | 8/2006 | |
| EP | 2 916 104 A1 | 9/2015 | |
| GB | 2 285 550 A | 7/1995 | |
| JP | 4293484 B2 | 7/2009 | |
| WO | 0109642 A1 | 2/2001 | |
| WO | WO-2016138585 A1 * | 9/2016 | ........... G01S 17/023 |

OTHER PUBLICATIONS

DE 102012011518 translation 52 pp. (Year: 2022).*
European Search Report in application No. 19217975.2 dated Jun. 25, 2020.

\* cited by examiner

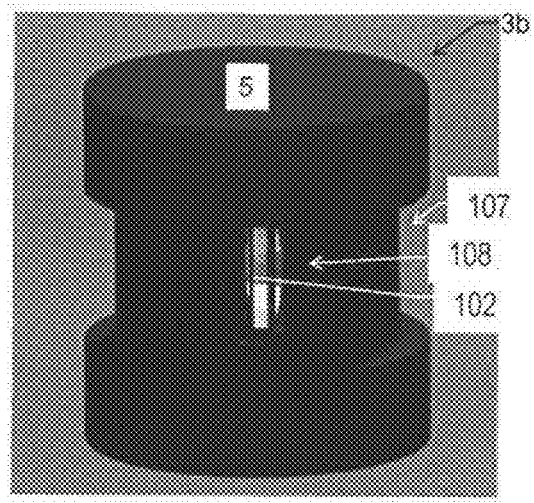 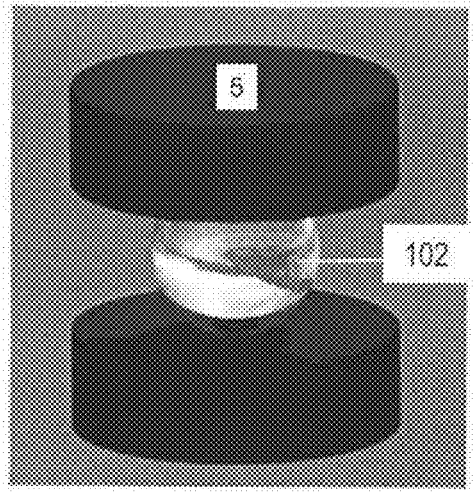
Fig. 13a  Fig. 13b
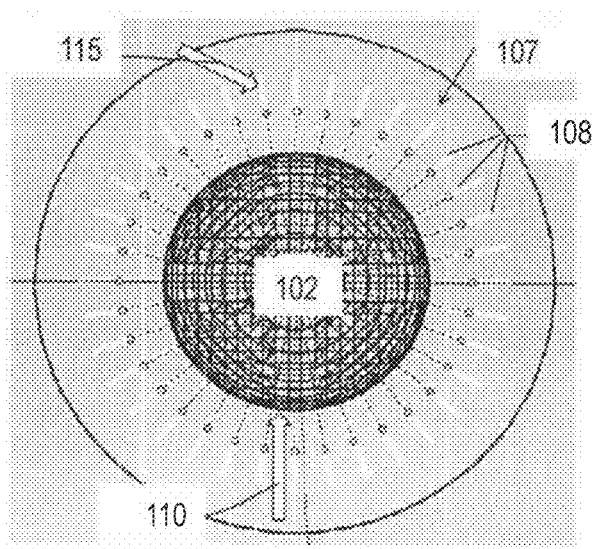
Fig. 13c

RETROREFLECTORS

CROSS-REFERENCE TO RELATED APPLICATIONS

This application claims priority to European Patent Application No. 19182962.1, filed on Jun. 27, 2019 and European Patent No. 19217975.2, filed on Dec. 19, 2019. The foregoing patent applications are herein incorporated by reference.

FIELD OF THE INVENTION

The invention relates to the field of retroreflectors. A first aspect relates to a reflector arrangement which provides a determination of the intrinsic orientation in relation to a surveying device, and a second aspect relates to a spherical retroreflector.

BACKGROUND OF THE INVENTION

Surveying systems for determining positions in the field of geodesy or the area of construction sites and/or construction are known in manifold forms. Examples of these are systems made up of a stationary surveying device having direction and distance meter, for example, a total station, and a measuring aid instrument marking a point to be surveyed or identified, for example, a pole. A geodetic measuring device of the prior art is described, for example, in the published application EP 1 686 350. Layout systems are also known made up of a stationary laser emitter, which generates a position reference by means of a laser beam, which reference is receivable by a laser receiver at the point to be marked. Surveying activities are thus performed by the interaction of a stationary device at a known location, which thus offers a position reference, with a receiving or marking and/or targetable measuring aid, whereby the position of individual terrain points such as land surveying points or points on construction site objects, for example, in the interior or exterior region of buildings or in road construction, can be determined precisely with respect to position measurement or marking.

Numerous different embodiments are known with respect to the design of the surveying devices. Thus, for example, modern total stations have microprocessors for digital further processing and storage of acquired measurement data. The devices generally have a compact and integrated structure, wherein typically coaxial distance measuring elements and computer, control, and storage units are provided in a device. Depending on the configuration level of the total station, a motorization of the targeting and/or aiming unit and also—in the case of the use of retroreflectors (such as a 360° prism) as target objects—means for automatic target search and tracking can also be integrated. As a human-machine interface, the total station can comprise an electronic display-control unit—generally a microprocessor computer unit having electronic data storage means—having display screen and input means, for example, a keyboard. The electro-sensorially acquired measurement data are supplied to the display-control unit, so that the position of the target point is ascertainable, visually displayable, and storable by the display-control unit. Total stations known from the prior art can moreover have a radio data interface for establishing a radio connection to external peripheral components, for example, to the measuring aid instrument or to a handheld data acquisition device, which can be designed in particular as a data logger or field computer.

For aiming at and/or targeting the target point to be surveyed, generic geodetic surveying devices comprise a telescopic sight, for example, an optical telescope, as an aiming unit. The telescopic sight is generally rotatable around a vertical standing axis and around a horizontal tilt axis in relation to a base of the measuring device, so that the telescope can be aligned on the point to be surveyed by pivoting and tilting. Modern devices can comprise, in addition to the optical visual channel, a camera, which is integrated into the telescopic sight and is aligned, for example, coaxially or in parallel, for acquiring an image, wherein the acquired image can be represented in particular as a live image on the display screen of the display-control unit and/or on a display screen of the peripheral device—for example, of the data logger—used for remote control.

Typical surveying devices have come to comprise as a standard feature an automatic target tracking function for prisms used as target reflectors (ATR: "Automatic Target Recognition"). For this purpose, for example, a further separate ATR light source and a special ATR detector (for example, CCD surface sensor) sensitive to this wavelength are additionally integrated into the telescope.

In many geodetic applications, surveying of points is performed in that specially designed measuring aid instruments or target objects (for example, surveying rods) are placed at the target point. These usually consist of a pole having a reflector (for example, a 360° prism) for defining the measurement distance or the measurement point. In such surveying tasks, data, instructions, speech, and further items of information are typically transmitted between target object and central measuring device for controlling the measuring procedure and for defining or registering measurement parameters. Examples of such data are identification information for the target object (for example, type of the prism used), inclination of the pole, height of the reflector above ground, reflector constants, or measured values such as temperature or air pressure. These items of information and/or situation-related parameters are required to enable high-precision targeting and surveying of the measurement point defined by the pole having prism.

In addition, a determination of the spatial orientation and/or an inclination with respect to respectively relevant spatial directions of the respective aid instrument is required or is to be set in a defined manner (for example, vertically), to derive the measurement point to be determined by means of the instrument together with the determined position of the reflector arranged on the aid instrument. Such an orientation can be determined, for example, by means of an inclination sensor, which is provided in a defined position and orientation in relation to the reflector.

The use of inclination sensors permits a simple orientation determination in two rotational degrees of freedom. In this way, roll and pitch of the measuring aid instrument, i.e., a respective rotation around a horizontal axis, can be determined. However, the determination of a third spatial direction proves to be more technically complex, a rotation around a vertical axis, for example, the pole longitudinal axis, the so-called yaw of the measuring aid instrument.

Solutions are known for this purpose from the prior art by means of additional devices on the part of the measuring aid instrument. The respective device is illuminated in this case, for example, from the side of the total station, etc. and the yaw angle can also be inferred on the basis of an angle of incidence or an image of a code. Such solutions are known, for example, from EP 2 916 104 A1.

It is disadvantageous in such solutions that in addition to the typically provided reflector, at least one further component is provided on the measuring aid instrument and thus an elevated level of complexity is provided with respect to the design of such instruments and/or the instruments have relatively large spatial dimensions. Moreover, a determination of the alignment is only possible in the scope of the respective limited sensor accuracy, in particular with respect to the use of inclination sensors. Furthermore, the additional components each contain additional error sources with respect to the position and orientation determination (for example, an undefined angle offset of the inclination sensor in relation to the reflector due to mechanical strain results in lower accuracy and/or corrupted values).

A solution according to EP 1 200 853, wherein a prism comprises a small passage opening for the measurement beam and this beam is partially directly incident on a sensor (similarly as in the case of the image of a pinhole camera), also has significant disadvantages with respect to achievable accuracies. A precise determination of the position of the radiation on the sensor is only provided in a very limited manner, since this determination accuracy is decisively dependent on the measurement distance, the beam quality, and the environmental conditions (fog, rain, dust, etc.). Minor soiling, for example, also in the form of a fingerprint on the prism outer surface, can result in an asymmetrical imaging or offset of the radiation transmitted through the small opening on the sensor and thus in a measurement error upon the analysis, for example, via a threshold-value-based focal point determination. Since only a single very small spot is analyzed, corresponding error influences are practically not detectable and result in strongly restricted robustness for measurements outside. Substantial measurement errors in the distance determination to this unit can also occur in the case of a distance measurement to this unit due to structurally related, reflector-internal reflections.

One object of the first aspect of the present invention is therefore to provide an improved, compact device which enables a more reliable and more accurate orientation determination, in particular having up to three degrees of freedom (three rotational degrees of freedom), for surveying purposes.

In particular, a more reliable and more accurate orientation determination is to be provided in up to six degrees of freedom, in three translational and in three rotational degrees of freedom.

Referring again to geodetic measurement apparatuses of the prior art as described, for example, in the publication document EP 1 686 350, spatial standard data recorded here are direction or angle and usually also a distance of a measuring system to a target point to be surveyed, and in particular the absolute position of the measuring system is captured in addition to any existing reference points. Therefore, such surveying instruments have electrosensory angle and possibly distance measurement functions, which permit the determination of a direction and distance to a selected target. The angle or distance variables are here ascertained within the internal reference system of the system and must still be linked, if appropriate, to an external reference system for absolute position determination.

For range finding, laser trackers or total stations have at least one distance meter, using a measurement beam, usually with a defined wavelength. In this case, a target point can be represented by a retroreflector which is targeted by the optical measurement beam generated by a beam source of the measuring device or of the measuring apparatus, in particular a laser beam. The laser beam is reflected back to the measuring apparatus in a parallel fashion, the reflected beam being detected by detection means of the apparatus.

In this case, an emission direction and respectively a reception direction of the beam are ascertained, for example by means of sensors for angle measurement which are assigned to a deflection mirror or a targeting unit of the system. In addition, with the detection of the beam, a distance from the measuring apparatus to the target point is ascertained, e.g. by means of time-of-flight or phase difference measurement or by means of the Fizeau principle. The position coordinates of the target point are determined on the basis of the emission direction and respectively the reception direction and the distance.

As said, target points are surveyed by placing specifically embodied target objects, for example surveying poles, at the target point. Said target objects usually comprise a plumb pole with a retroreflector for defining the measurement section or the measurement point. By interaction of an above-mentioned measurement system with a retroreflector that is used in each case—reflecting the incoming electronic distance measuring (EDM) signal towards the instruments EDM receiver optics—it is possible to reliably and precisely determine the position of said reflector and thus the point to be measured.

In addition, modern surveying instruments provide means for automatic target finding or tracking, such as active target recognition (ATR). This allows to automatically determine the exact lateral position of a retroreflector relative to the pointing direction of the measuring device. Such ATR-units use for example a separate IR-Laser or illumination means such as IR-LEDS as measuring light which is retroreflected by the retroreflector and detected e.g. by a position sensitive image sensor of the surveying instrument.

Usually for purposes of geodetic measuring, the tip of a plumb rod with the retroreflector is brought into contact with the target point on the ground or object and held perpendicular to determine the direction. In so doing, in order to determine the distance, the rod will be aligned horizontally. If standard retroreflectors are used, the rod has to be rotated about its vertical axis in such a way that it is aligned with the surveying instrument's line of sight such that the surveying beam aims at the retroreflecting element, e.g. a glass prism, and the prism reflects the light emitted by the surveying device back in the direction of the latter. When pointing to such a standard prism that is not perpendicular to the line of sight of the instrument, it is not easily possible to point to the actual prism center. This is a result of the refractive index between air and glass being different, thus adding possible further error in the measurement of the horizontal direction.

As an alternative to such single directional retroreflectors with limited angular acceptance range, use is made of 360° reflectors, which reflect light signals back from any horizontal alignment. Therefore, a vertical alignment as described above is not necessary. 360-degree retroreflectors, which reflect measurement signals from all directions, are particularly useful for terrestrial surveying with state of the art robotic total stations which utilize automated target recognition (ATR) and automated lock technology. This allows a higher level of convenience for the operator at the pole by avoiding the need to constantly align the prism to the instrument.

Such omnidirectional retroreflectors usually comprise prisms arranged in different geometries and a couple of different sizes. They comprise six individual prisms, glued together to form a ring and cover all directions. Due to the switching between the different, e.g. six, prisms when the direction of the impinging beam changes or the retroreflector rotates, there are disadvantageously significant systematic shifts which are responsible for significant accuracy uncertainties or measurement errors. Said otherwise, the transit of the reflection from one prism to the next, e.g. in case of rotation of the reflector about its yaw-axis, causes the reflected spot on the detector to slowly shift up or down as well as left or right. As another disadvantage, these 360°-prism have a limited acceptance angle with respect to their pitch axis. Other types of reflectors are embodied for example as segmented cat eyes. Their disadvantages are amongst others limited measuring precision, a jitter in position if rotated about the pitch axis and the existence of multi-spots. Still other types such as a reflective foil have disadvantageously limited precision and the need for readjustment with respect to yaw and pitch axis.

As another 360-degree retroreflector, spherical retroreflectors are in principle known in the art which "naturally" provide for a 360° angular acceptance range both in horizontal and vertical respect. Instead of a plurality of prism, they comprise a transparent sphere. The incoming measurement light is focused on the back surface of the sphere, reflected back the same way by the Fresnel reflection from the glass-air interface and is recollimated to create a "Cat-Eye"-type retroreflection. Thanks to perfect symmetry, there are no systematic shifts when rotating the sphere. As another advantage, disturbance by reflection at the front side (thus affecting a smaller target distance) is reduced compared to reflective prisms. With zero systematic errors it is theoretically possible to reach an exceptional accuracy (<<100 μm) with a spherical retroreflector.

However, compared to a prism, the reflection of such a sphere is weaker since the effective area of reflection is much smaller, and the retroreflectivity from the back surface is for example only 11% for a sphere with a refractive index of 2. Since the range and/or accuracy of distance measurements is highly dependent on the energy available from the returned laser beam, this results in a reduced measurement distance range and/or measurement accuracy.

The problem is further increased in case of strong ambient light as this worsens the signal-to-noise-ratio (SNR). This is particularly the case for outdoor surveying tasks due to direct solar irradiation. The sun creates a focus of itself on the front hemisphere of the sphere if impinging from the back side (the front side being the side of the sphere facing the geodetic measuring instrument). Another form of sun spot is specular reflection when the sun instead is behind the surveying instrument (instrument in between sun and surveying sphere) and is reflected on the first surface of the sphere. This sun reflection is less intense than the back-side-sun-spot, but nevertheless is a factor of disturbance.

Such a sun spot is then also imaged on the sensor of the surveying instrument and overlaps with the surveying light spot. Only at short distances and with a sufficient high sun elevation angle, the sun spot can be distinguished from the imaged retro-reflection of the measurement beam; even then, a sun spot may be mistaken as the retroreflected measurement light.

Particularly a completely unsolved problem is that at longer distances, it is no longer possible to resolve the sun spot from the measurement spot and one must rely on difference images to subtract the sun. It is known to use difference images on side of the surveying instrument resp. its image sensor in order to separate the measurement signal from the background. In order to form difference images, the images obviously must not be overexposed. This limits the exposure time due to the bright sun-spot.

In case of fast air turbulence, the sun spot moves slightly between two images, giving rise to artefacts in the difference image. In order to reduce the magnitude of such artefacts, it may be necessary to average a few images. At longer measurement distances, the sun spot is not any more separable from the reflection spot and it is difficult to say if the difference image is showing mainly the retro-reflection spot or sun-spot artefacts due to air turbulence, e.g. heat shimmer. Especially when using high magnification lenses (such as total station telescopes) heat shimmer artefacts are very visible, even on days when the sun is not heating the ground exceptionally strong.

In short, due to this disadvantages resp. limiting factors, in fact known spherical retroreflectors for geodetic measurements with e.g. total stations or laser trackers are not suitable for outdoor surveying or at medium to large distances (more than a few meters) or situations where there is no or no more than weak direct ambient light.

It is therefore an object of the second aspect of the invention to provide an improved spherical retroreflector.

SUMMARY OF THE INVENTION

Retroreflector Having Rotating Detection Field of View

The first aspect of some embodiments of the invention is based on the concept of angle-of-incidence-correlated detection of electromagnetic radiation entering a reflector.

The first aspect of some embodiments of the invention relate to a reflector arrangement for position determination and/or marking of target points, in particular for industrial and/or geodetic surveying. The reflector arrangement comprises a retroreflector, which provides a position determination for the reflector arrangement by means of parallel, in particular coaxial, measurement beam reflection and provides a passage surface for at least a part of the measurement radiation entering the retroreflector as orientation measurement radiation. Moreover, the retroreflector provides a reflector field of view having a first aperture angle around a yaw axis and a second aperture angle around a pitch axis orthogonal to the yaw axis.

Triple prisms or triple mirrors, which provide a corresponding parallel beam reflection, are typically used as retroreflectors in geodetic surveying. If the reflector is targeted using a surveying device, the measurement radiation is thus reflected back to the surveying device and a distance to the reflector can be determined with the aid of the signal thus detectable at the surveying device, for example, by means of runtime computation. A part, in particular a comparatively very small part, of the total measurement radiation cross section can pass through the reflector and is not reflected back. The passage surface provided for this purpose can be produced, for example, by severing a corner of a triple prism.

The reflector arrangement furthermore comprises a beam detection unit, by means of which the orientation measurement radiation passing through the retroreflector is detectable. The beam deflection unit is arranged downstream from the retroreflector with respect to the direction of incidence of the measurement radiation in the reflector arrangement.

A spatial orientation of the reflector arrangement is at least partially definable at least with the aid of a relative yaw angle with the aid of an orientation of a body-intrinsic coordinate system defined by at least the yaw axis and the pitch axis in relation to an external coordinate system, in particular is moreover definable with the aid of a roll angle and a pitch angle, wherein the yaw angle specifies a rotational alignment of the reflector arrangement around the yaw axis. The rotational alignment of the reflector arrangement is definable in particular with respect to a reference point (for example, setup position of a surveying unit) or a reference axis (for example, propagation axis of a measurement laser beam).

Furthermore, the beam detection unit comprises a first sensor for generating a signal in dependence on a detection of orientation measurement radiation and a first beam guiding unit, wherein the first sensor and the first beam guiding unit are arranged in such a way that a detection field of view for detecting the orientation measurement radiation is defined by an interaction of the beam guiding unit and the sensor, which field of view has an aperture angle around the yaw axis which is smaller than the first aperture angle of the reflector field of view, an alignment of the detection field of view around the yaw axis is variable by means of pivoting or rotating the beam guiding unit around the yaw axis and orientation measurement radiation passing through the retroreflector is detectable using the first sensor in dependence on the alignment of the detection field of view.

In one embodiment, the beam detection unit (sensor with beam guiding unit) is rotatably mounted around the yaw axis.

With respect to the design of the first beam guiding unit, according to one specific embodiment, it can comprise at least one beam passage, which beam passage is embodied as an oblong aperture, in particular is arranged extending in parallel to the yaw axis and/or is formed slotted. The beam passage can be embodied, for example, as a recess, in particular as a slot, in a cylinder wall of a hollow cylinder (having a circular footprint) for providing a beam transmission, wherein a center point of the hollow cylinder is located on the yaw axis or a cylinder axis of the hollow cylinder is coaxially aligned with the yaw axis.

By means of the recess, a transmission of entering measurement radiation can be spatially defined and/or limited with respect to the detection field of view. A detection of radiation using the sensor then only becomes possible when the radiation passes the transmission region delimited by the recess. Such a correspondence can be achieved by corresponding angle position of the beam guiding unit around the rotational axis.

The beam passage, in particular the recess, can be formed oblong in particular, wherein it is aligned in parallel to the yaw axis in particular. In such an alignment, the length of the recess determines a measurement range in the pitch direction.

The reflector arrangement, in particular the first beam guiding unit or the beam passage, can furthermore comprise at least one optical element for focusing the orientation measurement radiation, in particular a lens, for example, a cylinder lens or spherical lens, and/or an aperture. The beam passage can comprise, for example, a cylinder lens, whereby entering radiation can primarily be focused in a direction toward the yaw axis, i.e., into a line.

In one specific embodiment, the reflector arrangement, in particular the first beam guiding unit, can comprise a beam deflection means designed and arranged for deflecting and/or focusing the radiation onto the sensor, said radiation passing through the passage surface, in particular through the beam passage, in particular a mirror, a prism, or a body having a curved reflective surface, in particular a third-order freeform surface.

The first sensor of the beam detection unit can be designed according to one embodiment for generating the signal in dependence on a detection of the orientation measurement radiation and/or in dependence on an intensity of orientation measurement radiation incident on the sensor. The sensor (and its control) can thus solely be configured for registering a beam entry and/or for determining an intensity of this radiation.

In particular, the sensor is designed as a photosensitive sensor, in particular as a photodiode, for example, as a PIN diode, APD, or PSD (position sensitive detector). Alternatively, the sensor can be designed as a CMOS or CCD and/or can be configured for image acquisition. Furthermore, the sensor can be designed as a photosensitive surface and can make accessible the determination of a point or region of incidence of the radiation, for example, by means of focal point determination.

Moreover, a filter can be arranged upstream from the sensor. This filter can be designed to be wavelength-selective and adapted in such a way that measurement radiation of a geodetic surveying device reaches the sensor, but interfering ambient radiation or interfering reflections are filtered out. The filter can be, for example, part of the beam detection unit, in particular the beam guiding unit.

In one embodiment, the first beam guiding unit can define a rotational axis, which is in particular aligned coaxially or in parallel to the yaw axis, wherein the beam guiding unit is rotatably mounted around the rotational axis for variation of the alignment of the detection field of view and provides a rotation-angle-dependent, in particular rotation-angle-selective, acquisition of the orientation measurement radiation.

The reflector arrangement comprises in particular a drive unit, which provides a controlled pivot and/or rotation of the beam guiding unit around the rotational axis or the yaw axis.

In particular, the reflector arrangement can comprise an encoder unit, in particular an angle encoder, which is designed to acquire the alignment of the detection field of view, in particular to acquire an encoder angle specifying the alignment. The encoder unit can in particular be coupled to the beam guiding unit, the drive unit, or the rotational axis.

The alignment of the detection field of view is determinable in particular with respect to a yaw angle around the yaw axis using this embodiment.

According to one embodiment, the reflector arrangement can comprise an analysis unit, which is configured to derive a spatial orientation of the reflector arrangement in relation to the measurement radiation entering the retroreflector with respect to at least one degree of freedom on the basis of the alignment of the beam guiding unit, in particular wherein a yaw angle is determinable in relation to a propagation axis of the entering radiation. In particular, the analysis unit has an analysis functionality which is configured such that upon its execution, the derivative of the spatial orientation of the reflector arrangement is produced in relation to the measurement radiation entering the retroreflector with the aid of the alignment of the beam guiding unit.

According to one specific embodiment of the first aspect of the invention, the analysis unit is configured in such a way that it is designed to determine the alignment of the detection field of view in dependence on at least one first signal from the first sensor. The analysis unit can additionally be designed to receive and process an encoder signal.

The analysis unit can in particular be configured in such a way that an intensity-dependent signal curve is acquirable and, during a rotation of the first beam guiding unit, a signal intensity is determinable and storable in dependence on a respective yaw alignment of the first beam guiding unit, in particular in dependence on respective encoder signals, in particular angle information.

The analysis unit is in particular configured in such a way that the yaw angle is derivable in dependence on the determination of the alignment of the detection field of view, in particular wherein the yaw angle is determinable by means of signal analysis of the sensor signal, in particular by means of analysis of the intensity curve.

The angle of incidence of the detected measurement radiation can be inferred on the basis of the determination of the rotational alignment around the yaw and/or rotational axis in which the first beam guiding unit is located upon occurring beam detection. The rotational alignment corresponds to the alignment of the detection field of view.

A reflector arrangement according to the first aspect of the invention provides an at least partial determination of the spatial orientation in particular with respect to a yaw movement, i.e., a rotation of the reflector arrangement around the central rotational axis (yaw axis). The two other rotational degrees of freedom, roll angle and pitch angle, can be determined, for example, by means of gravitation inclination meter or (partially) also with the aid of the reflector arrangement. To determine the orientation in all three rotational degrees of freedom, the measurement data acquired for this purpose are preferably processed jointly. For example, if roll orientation and pitch orientation are determined by means of an inclination sensor, the azimuthal orientation of the measuring rod in relation to the total station can be unambiguously computed.

The measurement of the yaw is device-fixed, i.e., the measurement takes place around a fixed yaw axis. An inclination sensor (inclinometer) measures in relation to gravitation. If a measuring rod thus stands at least essentially vertically, a yaw takes place accordingly in parallel to the azimuth, and all three spatial angles can be easily determined.

With respect to the design of the reflector arrangement, in one embodiment, the retroreflector can be designed as a prism, in particular a triple prism, in particular mirrored, wherein the prism comprises a light entry surface forming a polygon, in particular a triangle, and the passage surface opposite to the light entry surface as an aperture.

The passage surface can be formed in particular at a corner of the prism, in particular wherein the passage surface is formed by an omitted corner of the prism and also defines a polygon, in particular a triangle. The retroreflector can in particular define an optical axis, wherein the optical axis extends orthogonally to the passage surface and in particular intersects the center point of the passage surface.

According to a further embodiment, the reflector arrangement can be designed as a 360° retroreflector having a plurality, in particular having six, retroreflectors arranged adjoining one another and designed as prisms.

The prisms are arranged in a ring shape, in particular form a ring, and the 360° retroreflector defines an overall field of view around the yaw axis of 360°.

The optical axes of at least two, in particular three, prisms in particular have a shared point of intersection with the yaw axis.

The orientation determination using a reflector arrangement according to the first aspect of the invention is performed with the aid of and in relation to the propagation axis of the measurement radiation incident on the arrangement, for example, emitted on the part of a total station. The measurement radiation then passes partially through one of the prisms, is deflected and focused on the sensor by the beam guiding unit (and by means of the optical assembly). Upon detection of the radiation, a measured variable with respect to a present rotational angle of the beam guiding unit is acquired.

The assistance by inertial sensors (IMU) is also possible to further enhance the measurement stability in case of a measurement beam interruption.

Due to the design of the reflector arrangement, the angle position of the beam guiding unit during beam direction correlates with the angle of incidence of the radiation in the prism. The azimuth of the reflector arrangement with respect to the propagation axis of the measurement radiation can thus be derived with the aid of the angle position.

If the reflector arrangement is rotated around the rotational axis, the angle of incidence changes. If the measurement radiation leaves the field of view of a prism in this case and enters the field of view of an adjacent prism, the measurement radiation is thus no longer incident on the previous sensor, but rather is deflected onto the opposing sensor.

In one specific embodiment, the majority of the retroreflectors can be arranged in such a way that the reflector arrangement comprises a central outlet, wherein the yaw axis extends centrally through the outlet, that the first beam detection unit is arranged in the outlet, and that the first beam detection unit is designed for the angle-of-incidence-dependent acquisition of the orientation measurement radiation passing through an arbitrary one of the passage surfaces of the retroreflectors over the overall field of view of 360°.

In this case, the beam guiding unit is in particular rotatable around the yaw axis inside the recess in relation to the reflectors.

According to one specific embodiment of the first aspect of the invention, the beam detection unit comprises a second beam guiding unit and a second sensor, wherein the first beam guiding unit is associated with a first prism group and the second beam guiding unit is associated with a second prism group, in particular wherein the first and the second prism group each comprise three prisms and/or the first and the second beam guiding unit are arranged in the outlet.

In other words, using such an embodiment, an allocation of the acquisition of the overall field of view onto two sensors can take place. Each of the beam guiding units is thus configured for a partial acquisition of the overall field of view, for example, 180° azimuthal each. However, the ability to acquire the spatial angle of 180° does not have to take place coherently, but rather can take place in sectors which are in turn divided and are not coherent.

The first prism group and the first beam guiding unit can especially provide an acquisition of the (deflectable) orientation measurement radiation, which can be provided by the first prism group and is projectable by means of the first beam guiding unit onto the first sensor, by the first sensor. The second prism group and the second beam guiding unit can accordingly provide an acquisition of the orientation measurement radiation, which can be provided by the second prism group and is projectable by means of the second beam guiding unit onto the second sensor, by the second sensor. An optical axis of the first sensor and an optical axis of the second sensor are in particular aligned in parallel or coaxially and the respective acquisition directions of the first and the second sensor are opposing.

In one embodiment, the center points of the passage surfaces of the prisms of the first prism group are located in a first plane and the center points of the passage surfaces of the prisms of the second prism group are located in a second plane. The first plane and the second plane are in particular aligned in parallel to one another and have a defined distance, in particular wherein the planes are aligned substantially orthogonal to the yaw axis.

The prisms of a respective prism group are arranged offset with respect to a position along the yaw axis in relation to the prisms of a respective other prism group.

In one embodiment, prisms of the first prism group and prisms of the second prism group can be tilted in opposition, in particular equal in absolute value, in relation to a plane aligned orthogonally in relation to the yaw axis. The alignment of the respective fields of view is accordingly also tilted, but preferably is selected so that a sufficiently large overlap region and thus a suitable overall field of view for a 360° acquisition results.

In a further specific embodiment, the beam detection unit can comprise a second beam guiding unit and a second sensor, wherein both the first and also the second beam guiding unit are arranged and designed for angle-of-incidence-dependent acquisition of the orientation measurement radiation passing through an arbitrary one of the passage surfaces of the retroreflectors over the overall field of view of 360°.

The first and the second beam guiding unit each comprise a beam deflection means (for example, a freeform mirror) and each comprise a slotted beam passage (for example, slit aperture) for this purpose. Both the first and the second beam deflection means and also the first and the second slotted beam passage are arranged and aligned at a yaw distance of 180° in relation to one another in each case. In other words, these elements are each arranged opposing (with respect to the yaw axis).

To provide the acquisition of not only the yaw angle but rather also the pitch angle, this arrangement comprises a tilt of the above elements.

A slot extension axis defined by the respective slotted beam passage is tilted by a defined angle with respect to the yaw axis around an axis parallel or coaxial to a roll axis, in particular tilted by an angle from an angle range of 30° to 60°, in particular by 45°. The roll axis is aligned orthogonally both to the yaw axis and also to the pitch axis.

Moreover, an alignment of the beam deflection means resulting upon a projection of the respective beam deflection means on a plane defined by the yaw axis and the pitch axis is also tilted with respect to the yaw axis around the axis parallel or coaxial to the roll axis, in particular by an angle from an angle range of 30° to 60°, in particular by 45°.

The tilts of the first beam passage and of the first beam deflection means are equal in absolute value and direction. The tilts of the second beam passage and the second beam deflection means are also equal in absolute value and direction.

In particular, the tilts of the first and second beam passage and also of the first and second beam deflection means are equal at least in direction around the axis parallel or coaxial to the roll axis.

A pitch angle can be derived here with the aid of a chronological or rotation-angle-related distance of two measurement signal acquisitions during a rotation of the beam guiding unit of less than 360°. This is achieved in particular by the tilts and the deviation thus provided in the signal acquisition.

The first aspect of the invention furthermore relates to a measurement aid instrument, in particular a pole, surveying rod, or scanning tool, having a reflector arrangement as described above, wherein the measurement aid instrument is designed for the contactless or tactile acquisition of a target point on an object having defined position relationship to the reflector arrangement. By means of the reflector arrangement, the position and orientation of the measurement aid instrument can be unambiguously determined in up to six degrees of freedom. The reflector arrangement is used in this case in particular to determine the azimuth (yaw angle) in relation to the line of sight between surveying device and measurement aid instrument.

Due to the provision of a sensor on the measuring rod and the acquisition of characteristic measurement radiation of a total station, etc., the measuring rod can be designed as an active aid. For this purpose, the measuring rod can comprise a transmitting unit and can be designed for transmitting information. For example, the measuring rod can generate a signal in response to a detection of a search beam and can thus communicate to the total station that the radiation is then incident on the reflector (search procedure for finding a geodetic target). Moreover, an ID for the determined target can be transmitted and it can thus be displayed which target was found or is presently targeted.

In another direction, information can also be transmitted to the measuring rod. No additional receiver is required on the part of the rod for this purpose, but rather the information can be transported by means of modulated electromagnetic radiation and acquired using the sensor.

Upon reception of a measurement signal, the reception can be confirmed to the surveying device via a communication connection and at the same time an item of identification information for the targeted target can be transmitted (target ID). This is advantageous if multiple 360° prisms or reflector arrangements are located in the region of the surveying device, in order to avoid a possible incorrect measurement of another reflector arrangement.

The emission of a scanning search beam of the surveying device for rapidly finding retroreflectors in the measurement space can also be confirmed by means of the reflector arrangement, as soon as the emitted search radiation (for example, fan-shaped) is acquired in the reflector arrangement by the detector.

In addition to the orientation determination, the reflector arrangement can thus also be used for searching and finding (power search). Moreover, the reflector arrangement can provide the transmission of a self-identification (target ID).

According to one embodiment, the reflector arrangement can comprise an overall field of view having an elevation acquisition angle, i.e., overall aperture angle of the field of view in the elevation direction, of at least 30° and up to 75°, and an azimuthal acquisition angle of 360°.

Spherical Surveying Retroreflector

The second aspect of some embodiments of the invention relate to a surveying spherical retroreflector for retroreflection of incoming surveying light such as a measuring laser beam or surveying target illumination light. The retroreflector comprises a transparent retroreflective sphere with a defined equatorial plane.

Preferably, the sphere has a diameter of at least 17 m or 24 mm, particularly at least 30 mm, specifically 34 mm. As another preferred option, the sphere's refractive index is (substantially) 2 or is a varying refractive index, in particular a stepped refractive index or a gradient refractive index (refractive index with respect to the (central) wavelength of the surveying light). Such glass types are known as H-ZLAF92 (CDGM, China) or S-LAH79 (Ohara, Japan). As another option, the refractive index is adapted to the measuring light used by a surveying instrument.

The retroreflector comprises a light shielding designed as shielding of the sphere against direct ambient irradiation, in particular solar irradiation.

In other words, the retroreflector has an ambient light shielding that reduces or prevents disturbance of measurement by environmental light directly impinging on the retroreflector. Such disturbing light arises for example from spotlights, reflecting surfaces such as mirrors or particularly from sun light.

Preferably, the shielding in designed for protection against low elevation ambient irradiation i.e. light which impinges with a relatively small angle with respect to the sphere's equatorial plane or the direction of the surveying light. For example, the shielding shields from ambient light beams impinging with an incidence angle of maximal 60° with respect to the equatorial plane resp. the horizontal. Therefore, the shielding comprises a side shielding, i.e. at least part of the shielding covers the area at or around the equator of the sphere or the northern hemisphere (complete northern hemisphere or part of it, e.g. 180° or 120° about the north-south axis) besides the "polar cap". In addition, the shielding may comprise a separate top shielding (hat) for shielding against high elevation ambient radiation.

Optionally, the side shielding extends 360° around the north-south-axis of the sphere. That means, that its effect does not depend on its "horizontal" orientation towards the surveying instrument which facilitates handling of the retroflector or makes the shielding effect independent of the (horizontal) position of the geodetic instrument relative to the retroreflector.

As another option, the shielding is at least partly retractable. Alternatively or additionally, at least part of the shielding is rotatable about at least one axis of the sphere, preferably 360° about the north-south-axis of the sphere. That means that the effective size of the shielding is adaptable and/or its position relative to the sphere can be changed.

Such a retraction and/or rotation is optionally effected automatically, in particular dependent on a detection of direct ambient light and/or of the surveying light. That means that the shielding is automatically adapted to the surveying situation by altering the position and/or effective size of the shielding area. For example, if no direct ambient light is detected (or at least no direct light with an impinging direction which could disturb the measurement), the shielding is minimized, e.g. such that the complete "naked" sphere can be used for surveying. Or if no surveying light is detected, this could mean that it is unintentionally blocked by the shielding, the position of the shielding is automatically changed. Or as another example, the surveying is started with retracted shielding and if light is detected on a surveying's instrument detector even without any surveying light, meaning that direct ambient light is the source of the measurement signal and not the wanted retroreflection, the shielding is automatically extended.

In embodiments with a side shielding as described above, preferably it is the side shielding which is fully retractable and/or freely rotatable 360° around the north-south-axis of the sphere.

As another option, the shielding is fixed relative to the sphere and the sphere (together with the shielding) can be moved (relative to a support) in that the sphere is rotatable about at least one axis, in particular about two axes perpendicular to each other.

Preferably, the shielding is rotation invariant with regard to an orientation of the sphere with respect to at least one axis of rotation, in particular with respect to a vertical axis or with respect to all three axis of rotation. That is that for example independent of the vertical alignment of the sphere or even independent of the sphere's 3-DoF rotational orientation, the shielding effect is the same.

In an embodiment, the side shielding is embodied as a hollow structure, preferably half-cylinder, running substantially around a north-to-south hemisphere of the sphere.

In another embodiment, the shielding, in particular said side shielding, comprises a structure limiting the angular acceptance range of impinging light beams. That means that only light arriving within a certain angular range reach the sphere, the other light is blocked.

For example, such a structure is embodied as a plurality of discrete fins running circumferentially around the sphere, preferably radial fins spaced equally apart to another, and perpendicular to the equatorial plane or perpendicular to the center point of the sphere, e.g. running from a top side of the sphere to its bottom side along the lines of longitude.

As another example, the structure is embodied as structured film or sheet, in particular arranged as a hollow cylinder coaxial to the north-south-axis of the sphere.

As still another example, the structure comprises a plurality of holes running circumferentially around the sphere, wherein the holes are pointing towards the sphere's center and the relation of hole diameter to the hole length defines the acceptance angle.

Optionally, the structure is modifiable in such a way that the angular acceptance range can be varied, for example by a change of the distance between said fins and/or their positioning angle.

As another option, the shielding, preferably said side shielding, comprises a reflective coating. The reflectivity of said coating is optionally in between 25% and 45%, in particular in between 33% and 38%, specifically the reflectivity is 33%. This coating increases the strength of the retroreflected signal as well as the front side (specular) sun-spot and reduces the strength of the back-side sun spot. Thus, the signal-to-background ratio is improved.

Alternatively, the reflective coating extends 180° at most around the north-south-axis of the sphere, in particular covers a north-to-south hemisphere, and has a near-total-reflectivity. Such a coating is for example embodied as a metal coating. In embodiments with a rotatable sphere as described above, the sphere having said reflective coating is optionally rotated around the north-south axis at a constant rate, thus "chopping" an incoming surveying beam and creating a modulated retroreflected signal which can be used for surveying light identification. The rotatable reflector can optionally also be used to track the surveying beam using a closed loop control system based on the reflected signal strength.

As another option the shielding, in particular said side shielding, comprises a band-pass light filter coating adapted to the wavelength of the measuring beam. This band-pass filter might also be applied on the receiving camera lens side of the surveying instrument. The band-pass filter can be based on a dielectric coating and/or a combination of absorbing filter materials to select a higher transmission only in the desired spectral range. Also a doping of the glass material is an option (e.g. like a red rubin sphere) to reduce the observable spectral range.

The second aspect of some embodiments of the present invention provides the advantage of a spherical retroreflector particularly suitable for outdoor surveying even in conditions with direct ambient light, particularly low elevation direct ambient light which would otherwise produce a strong light signal on the sphere's front facing the surveying instrument and thus on the instrument's measuring sensor. Due to the light shielding, such direct ambient light does not interfere with the measurement or at least only to such a reduced level that it can be well separated from the measurement signal resp. that the SNR is sufficiently high. The different embodiments provide such direct ambient light shielding for different retroreflector types or surveying conditions or demands.

In preferred embodiments, the "natural" 360°-usability of a spherical reflector is advantageously not reduced or destroyed by the shielding but maintained i.e. the shielding is rotation invariant at least with respect to the horizontal or for rotation about the north-south axis of the sphere. Thus, an all-around usability of an outdoor spherical reflector in combination with protection against ambient sun light in at least every horizontal position is advantageously provided. This is achieved either in that the shielding extends over 360° (at least horizontally). Or in that the (effective) size and/or position of the shielding is changeable and thus—preferably automatically—adapts to the surveying direction or the measurement conditions. At least, the shielding is designed such that the 360°-usability is only restricted if necessary in view of the presence of direct ambient light, e.g. in that the shielding is only effected if there is indeed direct sun light or more particularly if there is low elevation sun light.

BRIEF DESCRIPTION OF THE DRAWINGS

The devices according to the invention are described hereafter in greater detail solely by way of example with the aid of specific exemplary embodiments schematically illustrated in the drawings, wherein further advantages of the invention are also discussed. In the specific Figures:

FIGS. 13a-c illustrate an example of retroreflector with an ambient light shielding limiting the angular acceptance range;

DETAILED DESCRIPTION OF THE INVENTION

Retroreflector Having Rotating Detection Field of View

Figure 1:
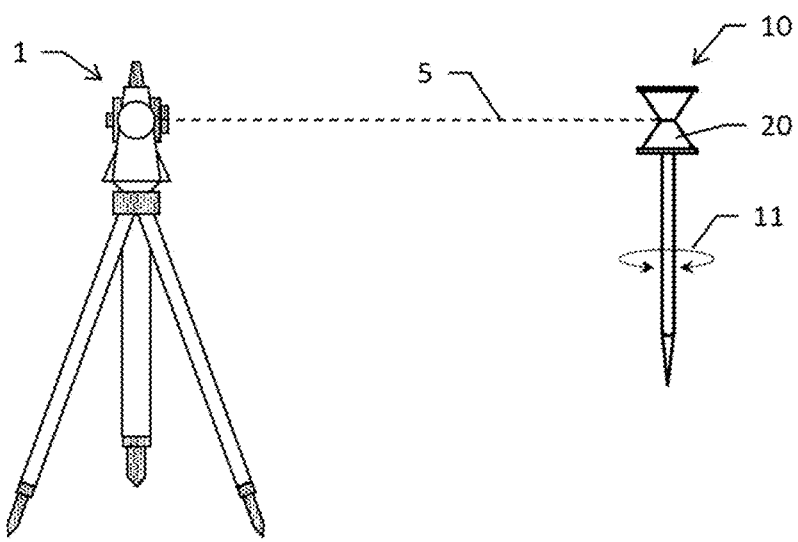
FIG. 1 shows a geodetic surveying system having a reflector arrangement according to the first aspect of the invention.

FIG. 1 shows a surveying device 1, in particular designed as a total station, theodolite, or multi-station, having a base and a support which is pivotable around a pivot axis in relation to the base, and having a targeting unit pivotable around two axes—pivot and tilt axes. A measurement laser beam 5 can be emitted using the target unit and is directed in the example shown onto a reflector arrangement 20 according to the invention of a measurement aid instrument designed as a pole 10. Typically (collimated) laser radiation, which can be generated by a laser diode provided on the surveying device 1, is used as the measurement radiation 5. The reflector arrangement 20 has a retroreflector and a sensor arrangement.

For a distance measurement, the measurement radiation 5 is reflected back in parallel by the retroreflector, acquired on the part of the surveying device 1, and analyzed with respect to an item of distance information, for example, by means of a runtime measurement. The location of the measurement aid instrument 10 can be ascertained with the aid of the determination of the angle position of the targeting unit in relation to the base, i.e., the emission direction of the laser 5.

For determining the orientation of the measurement aid instrument 10 at least with respect to the rotational degree of freedom 11 of the yaw—and according to a further embodiment also of the pitch—according to the invention, a part of the radiation 5 which is incident on the reflector arrangement 20 and not reflected passes through the retroreflector and is (selectively) conducted by means of a beam guide in dependence on the rotation angle onto an optically downstream sensor, in particular a photodiode. With the aid of a present rotational alignment of the beam guide, in which a beam detection of the passing radiation part is established using the sensor, a direction angle can be determined for the at least one degree of freedom with respect to the emission direction of the measurement radiation 5. During a survey, spatial position and orientation of the surveying device 1 are typically known. Thus, an absolute orientation of the measuring rod 10 can be determined in space, i.e., in a coordinate system, in which the surveying device 1 is calibrated.

Figure 2A:
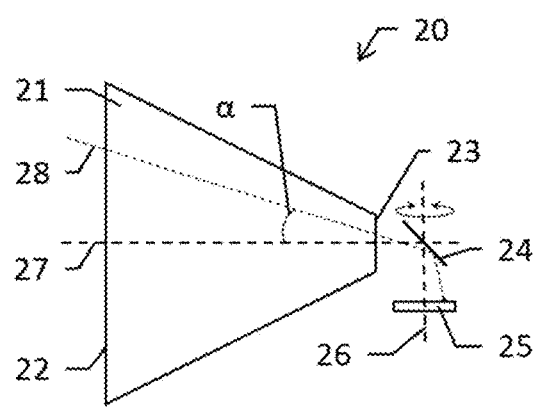
FIGS. 2a-b show an embodiment of a reflector arrangement according to the first aspect of the invention in cross section.

FIG. 2a shows a side view of a reflector arrangement 20 according to the invention in section.

The reflector arrangement 20 comprises a retroreflector 21 having a light entry surface 22 and a light passage surface 23. A beam deflection means 24 in the form of a mirror is arranged downstream in the direction of incidence with respect to the measurement radiation 28 to be acquired. The mirror forms the main part of the beam guiding unit here. The mirror 24 is rotatably mounted around a rotational axis 26. A turn or rotation of the mirror 24 can be provided by means of a drive unit (not shown) coupled to the mirror 24.

In the further course of the beam propagation, a sensor 25 is provided for generating a measurement signal in dependence on the acquisition of the measurement radiation. The mirror 24 and the sensor 25 are to be understood in the embodiment shown as forming the main elements of a beam detection unit in the meaning of the invention. In the example shown, the optical axis of the sensor 25 is located coaxially with the rotational axis 26 and the sensor 25 is designed as a line sensor. It is obvious that the invention also relates to an alternative embodiment, for example, having a parallel-offset arrangement of the axes and/or a surface sensor.

The invention of the embodiment shown is based on the approach of the measurement signal generation in dependence on the mirror alignment around the rotational axis 26.

The measurement radiation 28 enters the retroreflector 21 having a defined pitch angle of incidence $\alpha$ relative to the optical axis 27 of the retroreflector. The angle $\alpha$ represents in this case the relative orientation between measurement radiation 28 and retroreflector 21 in the pitch or elevation direction. In other words, the angle $\alpha$ specifies how strongly the retroreflector 21 is inclined in relation to the propagation axis of the measurement radiation 28.

Figure 2B:
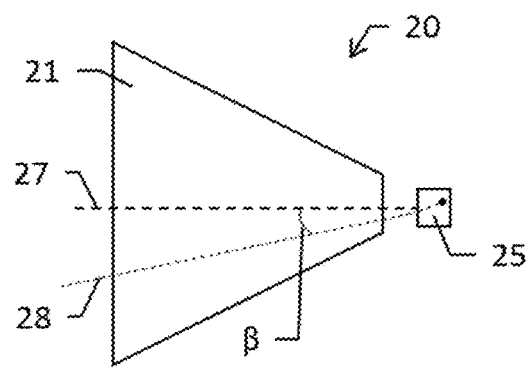

FIG. 2b shows the reflector arrangement 20 in section in a top view from above. The measurement radiation 28 accordingly moreover enters the retroreflector 21 having a defined yaw angle of incidence $\beta$ in relation to the optical axis 27 of the retroreflector. The angle $\beta$ represents in this case the relative orientation between measurement radiation 28 and retroreflector 21 in the yaw or azimuth direction. In other words, the angle $\beta$ specifies how strongly the retroreflector 21 is pivoted around the rotational axis 26 in relation to the propagation axis of the measurement radiation 28.

The determination of the yaw state of the reflector 21, i.e., a present angle ($\beta$) around the rotational axis 26, can be performed according to the invention by means of a rotation or pivot of the mirror 24 around the axis 26, a progressive detection at the same time of radiation possibly incident on the sensor 25, and a determination of the present mirror position upon detection of the radiation. The reflector arrangement 20 comprises for this purpose in particular an angle encoder, which makes an angle position of the mirror 24 around the rotational axis determinable.

If the reflector 21 is targeted using measurement radiation 28 (for example, collimated laser radiation, emitted by a surveying unit) on its light entry side 22, the measurement radiation thus enters the reflector 21 and is predominantly reflected back in parallel because of the geometry of the retroreflector 21. A non-reflected part of the radiation 28 exits at the rear end of the reflector through the passage surface 23 and is incident on the mirror 24.

The passage surface 23 can be shaped triangularly, for example, in particular upon provision of triple prisms.

In one specific embodiment, an aperture in the form of a hole or a slot can be arranged between the light passage surface 23 and the mirror 24, in particular if an imaging optical unit is omitted. The aperture does not rotate around the yaw axis 26, but rather is preferably arranged fixedly in relation to the passage surface 23. A desired yaw angle resolution results due to such an aperture.

As shown in FIG. 2a, the beam 28 is deflected by means of the mirror 24 onto the sensor 25, where a corresponding detection of the incident radiation takes place. However, the measurement radiation 28 is only incident on the sensor 25 in dependence on a present yaw angle of incidence $\beta$ if the mirror 24 is provided in the "correct" orientation around the axis 26, in particular if an azimuthally limited detection field of view is aligned in such a way that the measurement radiation passes through the detection field of view. If the angle $\beta$ changes with uniform mirror alignment, the beam 28 is no longer incident on the sensor surface. The sensor can thus be viewed as a trigger unit, using which an orientation measurement can be triggered upon occurring beam detection.

The mirror is preferably rotated continuously around the axis 26, wherein a signal which can be generated by the sensor 25 is progressively monitored. If a beam detection takes place using the sensor 25, a corresponding measurement signal is thus generated and acquired. Moreover, the resolution for the measurement signal generation can be set and optimized by an appropriately arranged and formed aperture. The sharper a projection of the incident radiation on the sensor 25 can be generated in this way, the more accurately a present yaw angle can be derived.

In the case of such a beam acquisition, a measurement signal with respect to the present angle position of the mirror 24 around the axis 26 is also acquired. This can be performed by reading out respective encoder measurement data. The alignment of the mirror 24 upon the beam detection correlates with the angle of incidence $\beta$. The present angle of incidence $\beta$ may be concluded with the aid of this information and thus the yaw alignment of the reflector 21 may be determined in relation to the propagation axis of the measurement radiation 28.

In an alternative embodiment, the sensor can be arranged with its detection surface directly behind the reflector 21 and can be rotatable around the rotational axis such that the measurement radiation is acquirable in dependence on an alignment of the detection surface. The mirror can be omitted in this way.

Figure 3A:
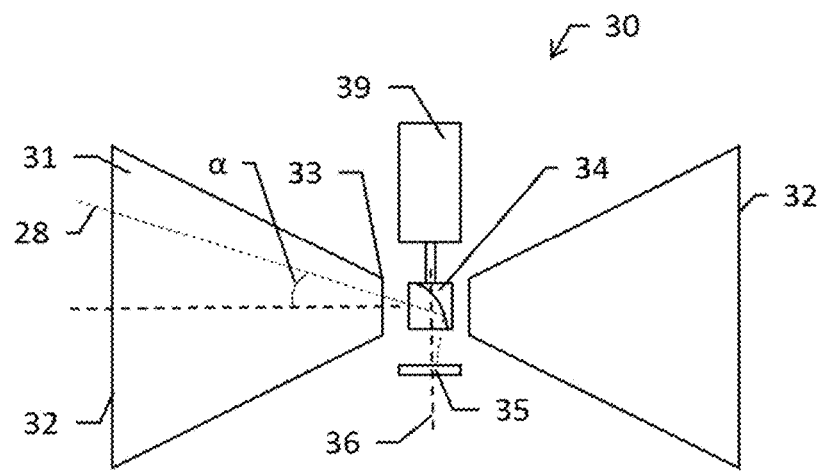
FIGS. 3a-b show a further embodiment of a reflector arrangement according to the first aspect of the invention schematically in cross section in a side view and in a top view.
Figure 3B:
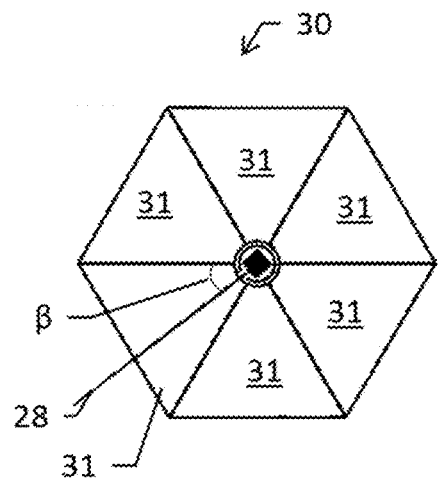

FIGS. 3a and 3b show a further embodiment of a reflector arrangement 30 according to the invention in a section in a side view and a section in a top view.

The reflector arrangement 30 comprises six retroreflectors 31, which are designed as triple prisms. The reflector arrangement 30 is designed as a 360° retroreflector and thus provides a reflection of measurement radiation over an azimuthal angle range of 360°. In other words, the reflector arrangement 30 provides a measurement beam acquisition over the total rotational angle of 360° around the rotational axis 36, each triple prism provides a measurement beam acquisition in an angle range of approximately 60°. The six individual triple prisms 31 enable the overall reflection range of 360° by a relative, ring-type arrangement. Two opposing prisms 31 of the total of six prisms are shown in cross section as representative in FIG. 3a.

The prisms 31 comprise respective light entry surfaces 32 and respective opposing passage surfaces 33, facing in the direction of the center of the arrangement, on the end sides facing outward thereof. To form such a light passage surface 33, in the case of a triangular prism 31, for example, the triple corner can be removed on the optical axis (for example, severed, ground off, polished off).

The reflector arrangement 30 moreover comprises a sensor 35 and a beam guiding unit having a beam deflection means 34. Moreover, a drive unit 39 (for example, motor or stepping motor) is provided, which is structurally coupled to the deflection means 34 and provides a rotation or a pivot of the beam deflection means 34 around a controlled rotational axis 36. Furthermore, the reflector arrangement 30 comprises an angle encoder which is coupled to the drive unit 39 and permits an acquisition of a relative angle position of the drive axis around the rotational axis 36.

The beam deflection means 34 comprises a freeform mirror, which comprises a surface profile adapted in such a way that the measurement radiation 28 passing through the passage surface is (at least partially) guided onto a central point on the sensor surface independently of its (elevation) pitch angle of incidence α. The sensor 35 can be designed in this embodiment as a PIN photodiode or as an avalanche photodiode.

In order that the passing measurement radiation 28 can be guided onto the sensor 35, the rotational alignment of the beam guiding unit around the axis 36 has to be adapted to the (azimuthal) yaw angle of incidence β of the measurement radiation 28 (FIG. 3*b*). In particular, the propagation axis of the measurement radiation 28 and an optical central axis of a detection field of view defined by the beam guiding unit and the sensor 35 are congruent in this case in a projection on a plane. The yaw angle of incidence β is defined in the embodiment shown with reference to an interface between two adjoining prisms 31, but can also be defined with respect to an optical axis of one prism.

In a detection mode, the beam guiding unit is rotated around the rotational axis 36 and a detection signal provided by the sensor 35 is monitored during this. The detection signal is, for example, only output in dependence on an adaptation and design of the sensor and of its control when the measurement radiation 28 reaches the sensor 35 or can be continuously generated variably in dependence on a presently measured beam intensity.

The determination of a measured variable with respect to the angle of incidence of the measurement radiation around the rotational axis 36, in particular of the yaw angle of incidence, is provided by establishing (measuring) an encoder position at the point in time of the beam detection. A corresponding detection can be configured by means of a processing and control unit. The processing and control unit can in particular provide a chronologically matched, in particular synchronous, acquisition of the signals of the sensor and the encoder. In this way, it can be ensured that acquired encoder measured values unambiguously correlate with the point in time or period of time of the beam detection.

To determine the correlation between encoder signal and optical detector signal, a one-time calibration of the sensor can be carried out. This can be performed, for example, after the production of the sensor as a factory calibration. Moreover, the temperature behavior of the sensor can is also be taken into consideration in this calibration. Corresponding effects in the absolute, optically measured yaw angle in use can then be taken into consideration via an installed temperature sensor.

For a precise determination of the present angle of incidence β, an analysis of an acquired time-dependent and thus (rotation-)angle-dependent intensity curve (cf. FIG. 4) can be performed.

Figure 4:
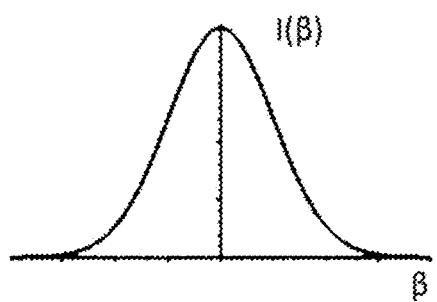
FIG. 4 shows an intensity profile which can be generated using the reflector arrangement according to the first aspect of the invention.

FIG. 4 shows an intensity I acquired using the sensor 35 in dependence on a yaw angle of incidence β. Since the detection field of view has an aperture angle around the rotational axis 36 of greater than 0°, the intensity curve results as a Gaussian or Gaussian-like curve. The curve shown results in particular after bandpass filtering and demodulation of the acquired measurement radiation. In this way, for example, a background light caused by solar radiation can be filtered and moreover an envelope can be generated around detected pulses of pulsed measurement radiation. The intensity profile shown corresponds to such an envelope. In addition to a reduction of the background light in the data processing, the use of optical filtering having absorption glasses and/or dielectric interference filters can also be provided. These filter elements can be placed in the beam path, for example, at the light passage surface 23 and/or in front of the detector 25.

An intensity maximum can thus be derived for the derived intensity curve I(β), and the corresponding yaw angle β can be determined for the maximum. This angle β corresponds to a central incidence of the measurement radiation and in this way enables an exact determination of the alignment of the reflector arrangement in relation to the measurement beam axis.

The demodulation of the envelope and locating of the intensity peak can be performed in a digital or analog manner.

Figure 5A:
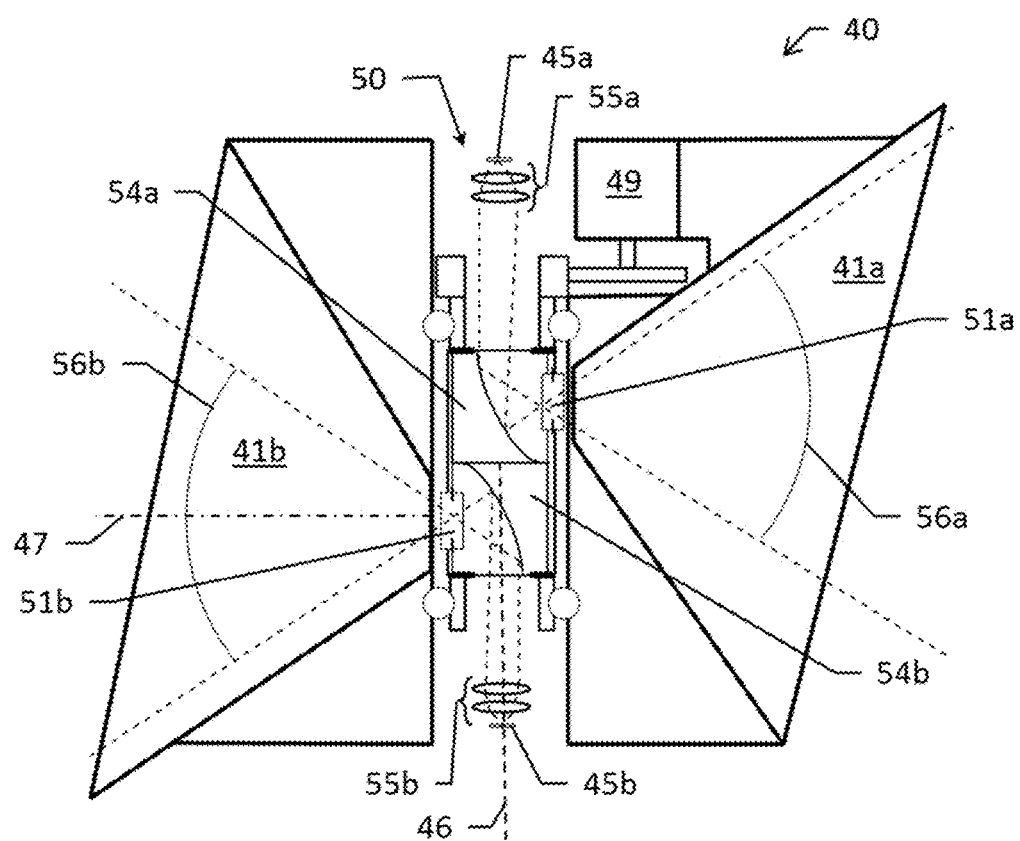
FIGS. 5a-b show a further embodiment of a reflector arrangement according to the first aspect of the invention in cross section in a side view and in a top view.

FIG. 5*a* shows a further embodiment of the invention. The reflector arrangement 40 again comprises six triple prisms, which are arranged in two groups of three prisms each (cf. FIGS. 6*a*-6*c*). The prisms of the first group, i.e., the fields of view thereof, are inclined by 15° downward here, the prisms of the second group are inclined by 15° upward. That is to say that two opposing reflector fields of view are accordingly tilted in relation to one another around the roll axis. FIG. 5*a* shows the reflector arrangement 40 in a section in a side view.

Due to the specific arrangement, an elevation field of view of ±30° with respect to the optical axis 47 of (each) prism (overall field of view of 60°) can be provided over the entire azimuth angle of 360° around the rotational axis 46. Measurement radiation, which is incident within this field of view 56*a*, 56*b* (detection field of view) in the reflector, can be acquired using one of the sensors 45*a* or 45*b*—in dependence on which prism the radiation is incident on and which group this prism is associated with.

The reflector arrangement 40 comprises two sensors 45*a* and 45*b* for this purpose, as mentioned. The beam detection unit 50 has two beam guiding units, which provide a deflection of the incoming radiation onto one of these two sensors. The beam guiding units are designed as a shared rotor and in this way provides a controlled turn or rotation of the associated elements around the rotational axis 46.

The beam guiding units are constructed substantially symmetrically such that respective optical elements are provided twice and in each case offset and/or mirrored. It is obvious that in an alternative embodiment having, for example, only one prism group (not shown), these components are only provided once.

The beam guiding units comprise a first beam passage 51*a* and a second beam passage 51*b* each having a cylinder lens, i.e., each of the beam guiding units comprises a corresponding beam passage. The respective beam passage 51*a* and/or 51*b* can alternatively be designed without a cylinder lens, but as a defined aperture (for example, as a slot in a hollow cylinder). Moreover, the first beam guiding unit comprises a first beam deflection means 54*a* and the second beam guiding unit comprises a second beam deflection means 54*b*. The beam deflection means 54*a*, 54*b* provide beam guiding of incident measurement radiation on the respectively associated sensor 45*a* or 45*b*. The beam deflection means 54*a* and 54*b* comprise curved reflective surfaces. Furthermore, a first and a second focusing group 55*a* and 55*b* are provided. The focusing groups comprise, for example, optical lenses or other optical elements, which permit focusing of electromagnetic measurement radiation. The required size of the detector element can thus be reduced.

In this embodiment, a slit aperture is arranged in each case between the respective beam deflection means 54*a*, 54*b* and the respective focusing group 55*a*, 55*b*. These apertures are located in particular in the focal planes of the respective focusing groups 55*a*, 55*b* or the focal plane of an optical element of the respective focusing group 55*a*, 55*b*.

The surface curvatures of the beam deflection means 54*a* and 54*b* are designed in such a way that measurement radiation, which is incident on the associated reflector within the respectively provided field of view 56*a* or 56*b*, is deflected in the direction of the respective focusing group 55*a* or 55*b*, respectively. The surface curvatures follow, for example, a polynomial curve of nth order, wherein n≥2. The surfaces are embodied, for example, as third-order freeform surfaces. By means of the respective focusing group 55*a* or 55*b*, the deflected radiation is focused on the downstream sensor 45*a* or 45*b*, respectively, and detected using the sensor.

The reflector arrangement 40 moreover comprises an electric motor 49, the drive axis of which is coupled to the beam guiding units. The coupling can be implemented, for example, by means of a belt, toothed belt, or gearwheel. Alternatively, a coaxial integration of the motor can also be implemented, in which the beam guiding unit functions as a rotor of a motor (direct drive motor). The coupling can be embodied as friction-locked or formfitting. The entire beam guiding unit having beam passages and beam deflection means can thus be rotated around the rotational axis 46.

The field of view 56*a* and/or 56*b* shown in the side view permits the acquisition of measurement radiation independently of the elevation angle of incidence thereof, i.e., independently of an angle of incidence in the pitch direction, as long as it is within the permissible pitch angle range (elevation aperture angle or aperture angle around the pitch axis). This angle range can be, for example, 60° (elevation field of view) as mentioned above. It is obvious that alternative angle ranges can also be provided in dependence on the design of the individual optical elements.

The dimension of the detection field of view 56*a* or 56*b*, respectively, is defined by the interaction of the optical properties (index of refraction, curvature, focal length, spatial dimensions, etc.) of prism 41*a* or 41*b*, beam passage 51*a* or 51*b*, deflection means 54*a* or 54*b*, focusing group 55*a* or 55*b*, and sensor 45*a* or 45*b*, respectively.

This dimension is not provided solely with respect to an opening around the pitch axis, but rather also with respect to an aperture angle around the yaw axis. This is illustrated by means of FIG. 5*b*.

Figure 5B:
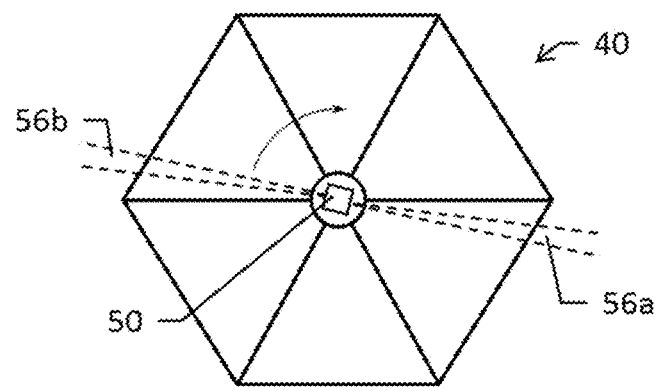

FIG. 5*b* shows the reflector arrangement 40 schematically from above in a sectional illustration. The two beam guiding units are located in the center of the arrangement 40, which, as indicated by the curved arrow, rotate around the rotational axis 46 (yaw axis). The field of view 56*a* or 56*b*, respectively, provided by the reflector arrangement rotates accordingly with the rotation of the beam guiding units around the yaw axis 46.

The aperture angle of the field of view 56*a* or 56*b* around the yaw axis, within which a deflection of incident radiation onto one of the sensors 45*a* or 45*b* is provided, is in particular significantly less than the aperture angle around the pitch axis. The provided measurement angle range around the yaw axis has, for example, an aperture angle of 5°, in particular of 1°. A laser beam oriented on the reflector arrangement 40 can only be acquired within this measurement angle range.

Due to the rotation of the beam guiding units and simultaneous detection of radiation possibly incident on the respective sensor, it is ensured, on the one hand, that the measurement radiation is detectable over the overall 360° rotation range and, on the other hand, with the aid of the signal which can be generated upon detection of the radiation using the sensor, a present rotation state (for example, by means of an angle encoder or step counting using a stepping motor) of the beam guiding units or one of the beam guiding units is established.

By way of the combination of the two signals (encoder and sensor), the rotation state of at least one of the beam guiding units at the point in time of the measurement beam acquisition may be established. This rotation state directly correlates with a present alignment of the reflector arrangement 40 around the yaw axis. A corresponding yaw angle, i.e., an alignment of the reflector arrangement 40 in relation to an incident laser beam, may be derived on the basis of the encoder information which can thus be generated, in particular together with an intensity profile.

The selection of the size of the aperture angle of the field of view 56*a* or 56*b*, respectively, around the yaw axis can be dependent in particular on the measurement speed (frame rate) and the sensitivity of the sensor 45*a* or 45*b* and a rotational velocity of the beam guiding units. The size of the aperture angle of the field of view itself is in particular dependent on the opening (width or diameter) of the aperture (here: slit aperture) and on the focal length of the cylinder lens of the respective beam passage 51*a* or 51*b*. For the provision of a small aperture angle, for example, a narrow slit of the aperture and/or a long focal length of the lens is provided.

In the case of a comparatively very small selected aperture angle, the determination of the yaw angle can be performed sufficiently accurately directly by means of processing of an encoder value determined upon the beam acquisition. A fast sensor having high measurement rate is used or the rotating of the beam guiding units is accordingly executed less rapidly for this purpose.

The determination of the yaw angle can, as already described above, be performed in the case of a larger aperture angle with consideration and processing of a progressive or continuous intensity measurement of the radiation incident on the sensor during continuous rotation of the inner deflection optical unit (cf. FIG. 4). The yaw angle can be derived very precisely from a rotation-angle-dependent intensity curve.

In an alternative measuring mode, a rotation of the beam guiding units can be stopped upon a detection of the measurement radiation and/or the alignment of the beam guiding units can be set so that the measurement radiation is incident on one of the sensors. Thereafter, the alignment of the beam guiding units is progressively set so that a continuous beam detection takes place. During a rotational movement of the reflector arrangement 40 in relation to a propagation axis of the measurement radiation, the alignment of the beam guiding units is tracked in accordance with a change of the azimuthal angle of incidence (tracking).

Such tracking can be performed, for example, by a progressive analysis of the intensity profile with iterative adjustment of the alignment of the beam guiding units. If the measured intensity decreases, the alignment is thus changed. If a further drop of the intensity should be established upon the change of the alignment, the alignment is changed in the opposite direction, so that the measured intensity approaches a previously established intensity maximum.

Alternatively, the sensor can be embodied as a position sensor or image sensor, which makes an absolute value and/or direction of an offset of a beam point of incidence in relation to a sensor center determinable (for example, by means of image processing or detection-surface-related focal point determination). The tracking of the beam guiding units can then be performed in such a way that the offset is reduced and/or goes to zero.

The sensor can be designed as a CCD or CMOS or as a position-resolving detector sensitive with respect to the wavelength of the measurement radiation.

An embodiment corresponding or similar to FIG. 5 will be described in other words hereafter. Only the collimator optical unit is rotated, while the PIN photodiode is stationary, for example. The diameter of the optical unit between the retroreflectors is in particular selected to be as small as possible, wherein the components can be larger above and below the prisms. The provided photodiode is also selected to be small, since such sensors provide a greater chronological bandwidth. An acquirable inclination range (pitch angle range) is in particular ±30°, i.e., a total of 60°.

For the two groups of retroreflectors, two optical channels are provided, wherein the internal circle diameters of the passage surfaces are approximately 4.5-5.5 mm. In the case of a larger internal circle diameter, one channel can be omitted. The reflection mirror of both channels has in each case a third-order freeform surface in the direction of the yaw axis and a planar surface orthogonal thereto. A cylinder lens having a focal length in the range of f=10-f=15 mm and an aperture diameter of 1-3 mm focuses the incident electromagnetic radiation into a line of defined width. A focusing group consists of two lenses. They project the entry pupil of the cylinder lens onto the photodiode with a diameter of, for example, 4 mm.

The rotor (beam guiding units) consists of two cylinder lenses and two freeform mirrors and has a diameter of approximately 8.5 mm. The rotor is mechanically connected to the prism frame using ball bearings or plain bearings and is driven by an axial or axially-offset motor via a gearwheel or a belt. Two stators consisting of the photodiodes and the focusing groups are arranged symmetrically above and below the rotor and collect incident light in the defined pitch range of ±30°. The two photodiodes immediately measure the intensity of the incident light at high bandwidth. A synchronization with the beam emission on the part of the total station is not required.

The cylindrical collimator (cylinder lens) leaves the incident, planar wavefront unchanged in the direction of the longitudinal axis of the cylinder lens and curves the wavefront in the direction perpendicular to the longitudinal axis of the cylinder lens, which focuses the incident electromagnetic radiation into a line. A selected aperture diameter is in particular smaller than the measurement beam diameter.

The deflection means in the form of astigmatic freeform mirrors (third-order polynomial in the y direction and planar in the x direction) are used to align the divergent main beams in parallel. This enables small diameters for stator and rotor and a comparatively large distance of the stator, whereby more space is available for further mechanisms.

Figure 6A:
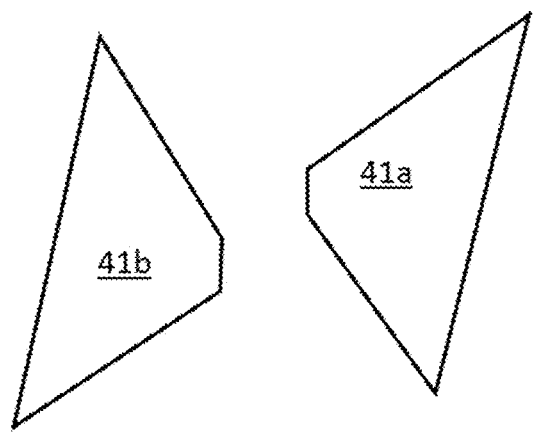
FIGS. 6a-c show a geometrical structure of a reflector arrangement according to the first aspect of the invention.
Figure 6B:
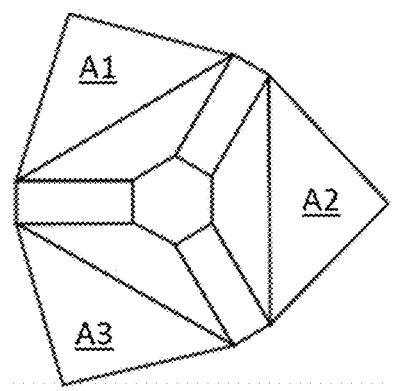
Figure 6C:
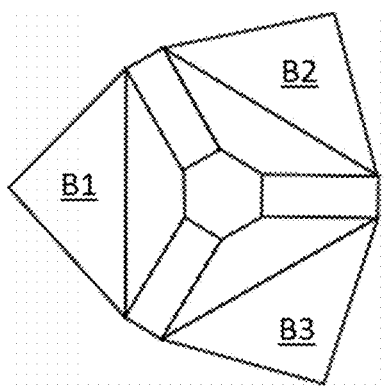

FIGS. 6a-6c illustrate the geometry of the structure of one embodiment of the reflector arrangement 40 according to the invention according to FIG. 5a. The reflector arrangement 40 comprises six triple prisms, which are arranged in two groups A and B of three prisms each. The prisms of the first group A, i.e., the prism fields of view thereof, are inclined by 15° downward here, the prisms of the second group B are inclined by 15° upward. Each group A and B of the individual retroreflectors are thus, for example, respectively inclined by +15° and −15° in relation to a horizontal axis of a pole.

FIG. 6a shows a side view of the reflector arrangement 40 in section, wherein only the triple prisms 41a and 41b are shown. The second prism 41b is associated with the second group B of prisms, the first prism 41a is associated with the first group A of prisms.

The yaw sensor unit (beam guiding unit and sensor) is integrated centrally into the 360° reflector. A measurement of the angle of incidence of the EDM laser can thus take place coaxially.

Due to the inclination of the prisms, in particular a vertical offset of the retroreflector corner tips of both groups of greater than 1 mm results. A minimal end face of remote corner tips of the prisms can be implemented in that the respective corner is cut so that the triangle base length enables a yaw measurement range of 60° for each retroreflector.

This configuration results in a vertical offset and requires, as shown, two measurement channels to cover the measurements by both prism groups A and B.

FIG. 6b shows the prisms of group A in the arrangement thereof in a view from below. FIG. 6c shows the prisms of group B in the arrangement thereof in a view from above.

An overall field of view resulting from the arrangement shown, i.e., over an azimuthal angle range of 360°, continuously provides a viewing angle (elevation) of at least ±30° in the elevation direction (orthogonal to the azimuth; total aperture angle of at least 60°, in relation to the horizontal plane).

This reflector arrangement 40 of a 360° reflector comprises an advantage that the optical axis of the sensor is substantially coaxial with the optical axes of the associated prisms due to the deflection by means of the specific optical assemblies. The measurement radiation of the distance measurement unit of a total station can thus be used simultaneously for orientation determination of the reflector arrangement 40 or a pole supporting this arrangement. Moreover, the sensor arrangement is fully integrated into the reflector and is not externally visible. The reflector arrangement 40 is thus embodied very compactly. A further advantage is the very good isolation from environmental influences (for example, moisture, dust) from the outside provided in this way.

As shown in FIG. 6a, respectively opposing prisms are offset with respect to the positioning thereof along the rotational axis, on the one hand, and the angle between the passage surface and the entry surface of the first prism 41a and the passage surface and the entry surface of the second prism 41b is preferably identical in absolute value, but opposing with respect to the direction, on the other hand. In the exemplary embodiment shown, respectively adjacent prisms are accordingly aligned differently.

Each of the two sensors 45a and 45b is arranged and configured for acquiring light from three prisms in each case.

It is obvious that the invention is not limited to an embodiment having six prisms. Rather, embodiments are also included, which comprise more (or fewer) than six individual prisms.

Figure 7:
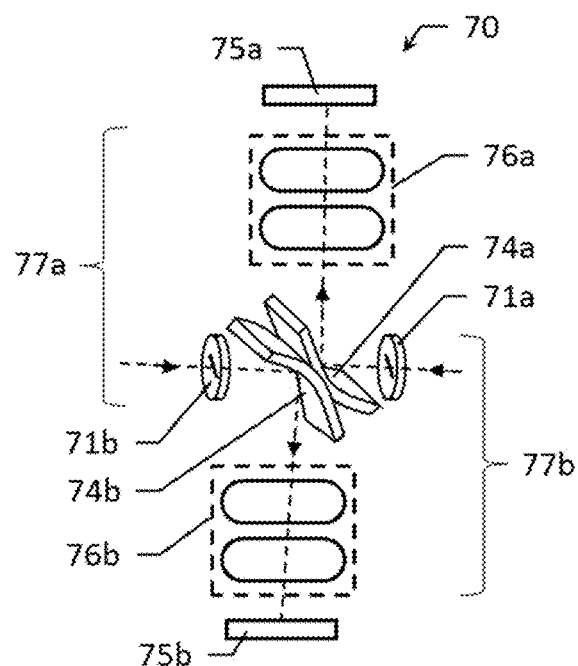
FIG. 7 shows a further embodiment of a reflector arrangement according to the first aspect of the invention for determining yaw and pitch alignment in cross section.

According to a further embodiment according to the invention, as shown in FIG. 7, both a yaw and also a pitch can be determined using the reflector arrangement.

For a determination of the azimuth of the pole vector (vector of the pole) at 90° roll angle (i.e., in particular in a horizontal alignment of the pole), an additional determination of the orientation in the pitch direction is required. The azimuth angle can generally be derived with differing sensitivity from the yaw angle. If the pole is parallel to the field of gravity (roll angle=0°), the azimuth angle is equal to the determined yaw angle. The sensitivity dAzimuth/dyaw decreases proportionally to cos(roll angle), however. If the roll angle=90°, the azimuth is no longer dependent on the yaw angle, but rather is equal to the present pitch angle. For a 6DOF determination of the pole, the measurement of the pitch angle can thus also be significant.

This can be implemented by the use of a beam detection unit 70 having two beam guiding units 77a, 77b and two sensors 75a, 75b, which define oppositely inclined pitch planes. Such a sensor configuration requires, for example, an internal diameter of the transmission surfaces greater than 5.5 mm, since each sensor has to cover the entire 360° yaw range.

The center points of the passage surfaces of the prisms are preferably on a shared plane here.

The inclined pitch planes are implemented by the arrangement of co-rotating cylinder lenses 71a and 71b (in combination here with an aperture formed as a slit) and respective freeform mirrors 74a and 74b, wherein these components are provided inclined (i.e., rotated around the roll axis) by 45°. In a projection of the inclination axis defined in this way and the yaw axis on a plane, these axes enclose an angle of 45°.

The two beam guiding units 77a and 77b are arranged in such a way that the freeform mirrors 74a, 74b are arranged back to back in relation to one another, and that the cylinder lenses 71a, 71b have opposing tilt direction and alignments, but the optical axes thereof are in one plane. The yaw distance for the two freeform mirrors 74a, 74b and for the two cylinder lenses 71a, 71b is 180° in each case. The detectors (sensors) for both arrangements are to be located respectively above and below the slit opening. Further optical assemblies 76a, 76b are preferably provided for the beam guiding of the incident measurement radiation (focusing of the radiation onto the sensor), which provide a robust and position-accurate detection on the part of the sensor.

Because of the limited space available for the freeform mirror, the respective inclination planes may be slightly curved.

The determination of the pitch angle can thus be performed by detection of the entering measurement radiation using both sensors 75a, 75b. Due to the differences of the light detection provided by the different inclinations, a derivative of the pitch angle may be implemented from a comparison of the measurement signals thus acquired. The pitch angle can be derived in particular from a time difference of the signal acquisition of the two measurement channels or with the aid of a rotation-angle-dependent signal acquisition.

Figure 8A:
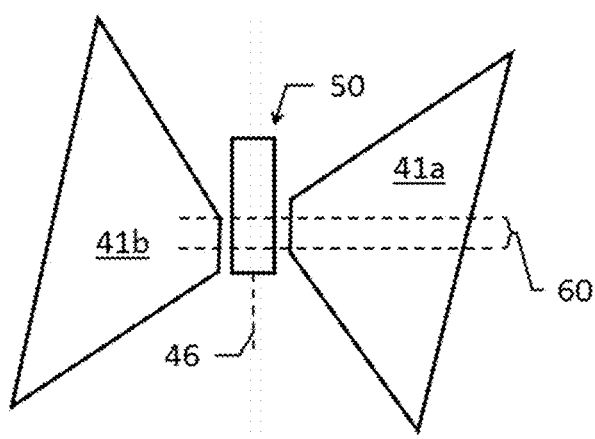
FIG. 8a-b show a further embodiment of a reflector arrangement according to the first aspect of the invention in cross section in a side view and schematic illustration of its passage surfaces.

FIG. 8a shows a further embodiment of the reflector arrangement according to the invention. Two of the reflectors (41a and 41b) are again shown as representative for a plurality of retroreflectors arranged in a circle around the yaw axis.

The projections of the respectively opposing passage surfaces onto a plane parallel to the passage surfaces have a shared intersecting surface, i.e., the projections overlap. The illustrated overlap region 60 relates here to all provided reflectors and the passage surfaces thereof. The illustrated overlap region 60 is spanned in particular by a virtual rotation of the illustrated region around the yaw axis 46.

This enables (only) one beam detection unit 50, which provides a beam acquisition within the overlap region 60, to be required for determining the yaw angle. Specifically, a beam guiding of incident laser radiation onto a single sensor over a yaw angle range of 360° can be provided here, for example, by means of a single deflection mirror, which is rotatable, i.e., independently of the azimuthal incidence direction if the radiation is incident within the elevation reflector field of view and/or the elevation detection field of view.

The vertical offset of the respective reflectors (prisms) can be selected in this case in dependence on desired installation space in the interior of the reflector arrangement and sufficient overlap for a robust beam acquisition.

Figure 8B:
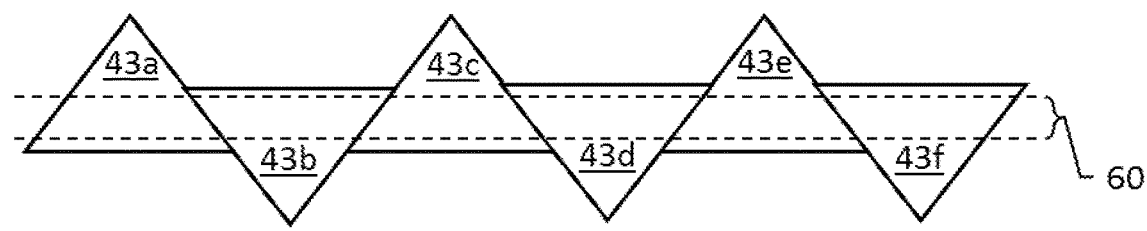

One possible relative arrangement of passage surfaces 43a-f of adjacent prisms according to one embodiment of the invention is shown by FIG. 8b. The passage surfaces 43a-f are illustrated unrolled on a plane for clarification. The prisms and/or the passage surfaces 43a-f thereof are arranged offset in relation to one another (in the direction along the yaw axis) in such a way that one overlap region 60 shared by all passage surfaces 43a-f results.

It is obvious that these illustrated Figures only schematically illustrate possible exemplary embodiments. The various approaches can also be combined according to the invention with one another and with geodetic surveying systems of the prior art.

Spherical Surveying Retroreflector

FIGS. 1a, 1b and 1c illustrate examples of transparent spheres 2, 2' used for retro-reflection of an incoming surveying or measuring light 10, e.g. laser beam or narrow-angle LED-light emitted by a terrestrial geodetic instrument such as a total station or laser tracker.

Figure 9A:
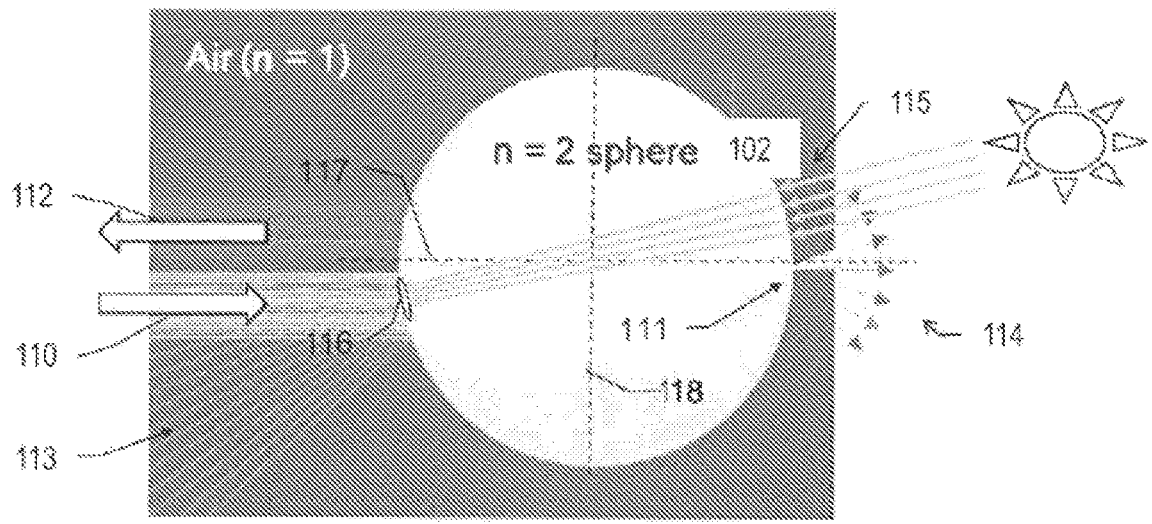
FIGS. 9a-c illustrate examples of transparent spheres for retro-reflection of incoming surveying light and the effect of direct environmental light.

FIG. 9a shows a transparent sphere 102 together wherein in addition the equatorial plane 117 and its north-to-south or vertical axis 18 are indicated. The equator or north-south axis are normally defined by the intended orientation of sphere 102 for surveying operation resp. by fixation to a support such as a measuring pole as shown in FIG. 10a or 11a-12b. The equator is also normally in the horizontal plane since the pole must be held perfectly vertical in order to accurately offset the measurement point from the center of the sphere to the tip of the pole.

The sphere 102 is homogeneous with a refractive index of (substantially) 2. Besides specular reflection 113 of incoming surveying light (such as a measuring laser beam), the incoming light 110 is focused on the back surface 111, reflected back by the Fresnel reflection from the glass-air interface and is recollimated to create a "Cat-Eye"-type retroreflection (outgoing light beam 112).

In such exemplary spheres, due to dispersion of the so far known optical materials, the sphere 102 only works in a limited spectral range with a peak dependent on the material glass type, e.g. a peak for red visible light for n=2 glass, with a tail into IR but an abrupt drop towards shorter wavelengths. At "longer" red and infrared, the reflection comes from a ring around the center of the sphere where spherical aberrations compensate for the deviation from n=2.0.

Figure 9B:
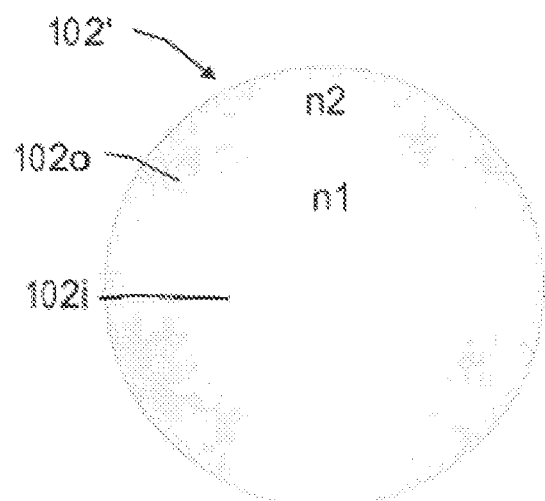

Such a retroreflection can be obtained quite similarly with alternative sphere 102' shown in FIG. 9b which has a stepped refractive index instead of the unvarying one of sphere 102. In the example, the sphere 102' consists of an inner sphere 102i of a material with a first refractive index n1 and an outer shell 102o with a second refractive index n2. For instance, the first refractive index n1 is 1.8 and the second refractive index 1.5. Preferably, the coefficients of thermal expansion of inner and outer sphere are at least nearly equal to avoid tension due to temperature change.

As another alternative (not shown), the sphere used for retroreflection has a gradient refractive index, e.g. growing steadily or at least quasi-continuously from the outer, starting with an index of e.g. 1.3 on the outside and growing towards the center with the end value of e.g. 2, whereby the end value can depend on the gradient index profile.

Compared to a prism, the reflection of transparent spheres 102 or 102' is weaker since the effective area of reflection due to spherical aberrations is much smaller, the reflectivity from the back surface is only 11% in case of sphere 102 (the main part of the incoming light leaves the sphere 102 out of its back side, as indicated by arrows 114), spherical aberrations causing wavefront distortion on the back propagating beam. Theoretically, with zero systematic errors it is nevertheless possible to reach an exceptional accuracy (<<100 μm) with this type of reflector.

However, this accuracy is severally reduced in practice, particularly the longer the measurement distance and the more there is ambient light directly impinging on the sphere 102. This is merely the case in outdoor surveying, where ranges of up to hundred meters or more and sun light are custom.

As one improvement, the diameter of sphere 102 or 102' is chosen relatively large. Preferably, the sphere's diameter is at least 17 mm, 24 mm, 30 mm or 34 mm. A large sphere 102 increases the measurement signal as well as the separation between retroreflection 12 and an ambient light spot 116 (cf. below). Mechanically, a larger sphere 102 may also be more practical. With a 24 mm sphere, the signal strength would be doubled, 30 mm tripled and 34 mm quadrupled compared to a 17 mm sphere. Whereas with a larger sphere 102 the transmitted "sun spot" 116 will also be larger—so the balance between signal and sun will be the same though the overlap between sun focus spot 116 and measuring light retroreflection is reduced—, however the contrast relative to the background ("white wall") is improved and the exposure time will be reduced at larger surveying distances.

Ambient light such as sun beam 115 is in particular disturbing if—as indicated in FIG. 9a—impinging on the back side of the sphere 102 (thus near the reflection spot 111) with low elevation, i.e. a small incident angle in relation to the equatorial plane 117 of the sphere 102 resp. to the surveying direction or axis of the surveying light (direction of arrow 10), e.g. an incident angle of maximal 60° or maximal 50°. The sun light 115 impinging on the back hemisphere leads to a bright spot 116 (generating stray light on the sphere surface) on the front side near the exit place of the surveying light 112, a problem which is unknown to 360°-prism retroreflectors as direct ambient light from the "back" is simply retroreflected to the back side and not "forwarded" to the front side.

Then, both the retroreflected light beam 112 as well as the sun spot 116 are imaged on an optical sensor of a geodetic instrument, e.g. a total station or laser tracker, with which an object point is to be surveyed with help of retroreflective sphere 102. As the position of both the retroreflected measuring beam 112 and the sun beam 115 focused on the front hemisphere is at least nearly equal, their positions on the optical sensor is nearly equal, too. Thus, the surveying instrument is unable to identify the greatly disturbed measurement beam 112 resp. determine its position on the sensor, and the surveying accuracy (of the location of the sphere 102 to be measured) is severely diminished.

Figure 9C:
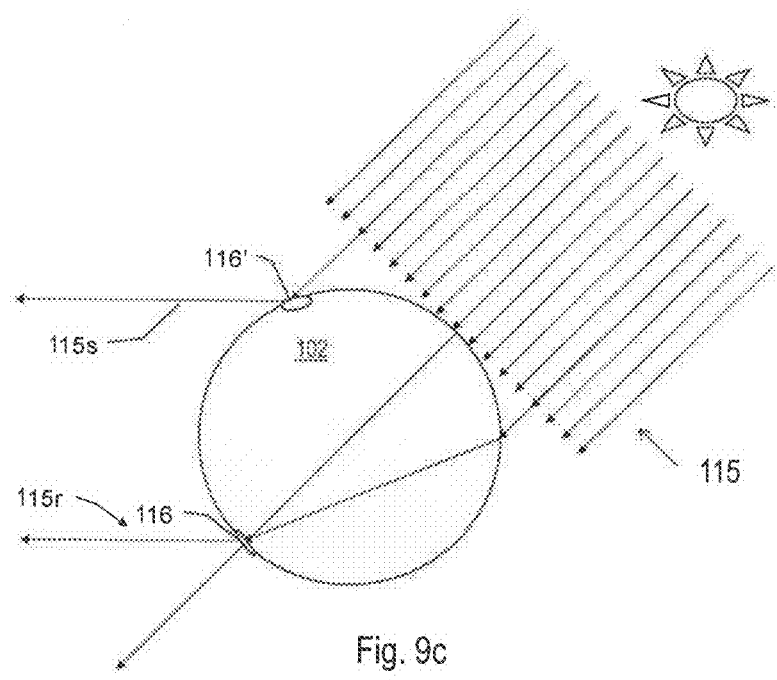

FIG. 9c is another illustration of disturbing effects of ambient (sun) light. The Figure shows the refractive sun spot 116 created by back side sun light 115 as described above. Part of the light 115r of his sub spot 116 goes "horizontally" in direction to the surveying instrument while another part is strayed in other directions.

In addition, part of the ambient sun light 115 is reflected at the top of sphere 102 in direction to the surveying instrument (light beam 15s). Thus, there is not only the first sun spot 116 but a second sun spot 116' is present in the surveying instrument's image of sphere 102 resp. on its image sensor. This specular sun spot 116' is another disturbance of the surveying.

Figure 10A:
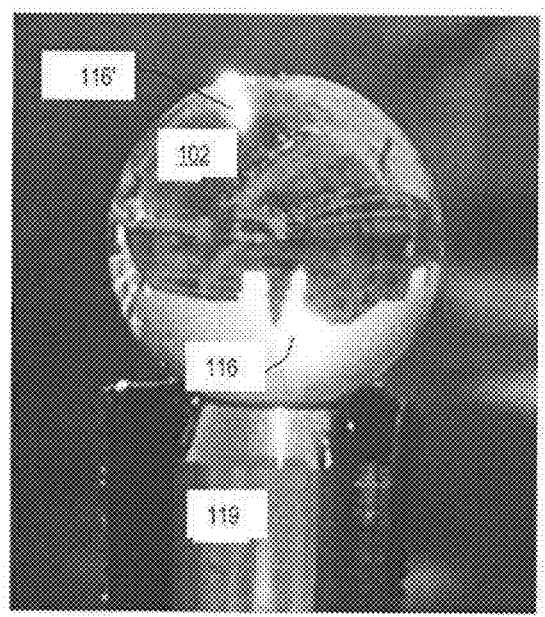
FIGS. 10a-b illustrate the disturbing effect or influence of direct ambient light.
Figure 10B:
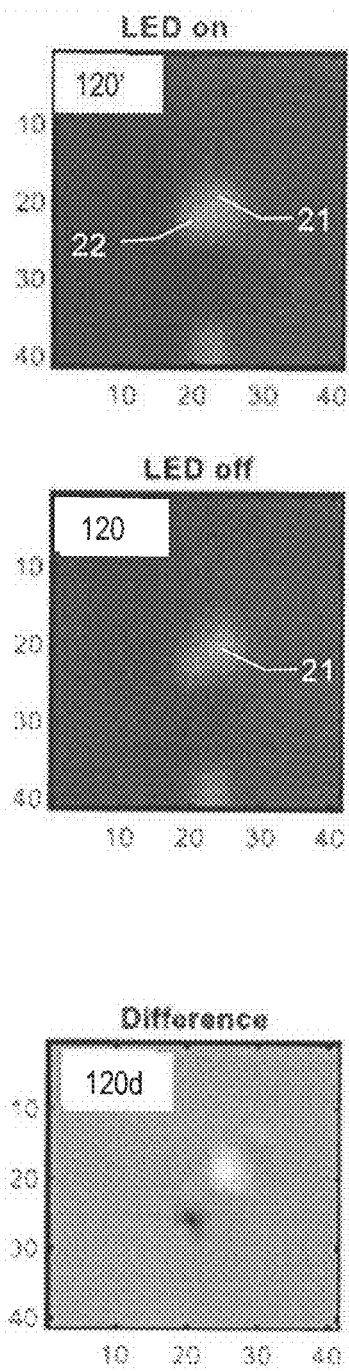

FIGS. 10a, 10b illustrate further the disturbing effect or influence of direct sun light.

FIG. 10a is a photo of a transparent retroreflective sphere 102 mounted on a surveying pole 119, positioned outdoor with the sun shining from behind the sphere 102. As can be seen, this direct ambient light leads to a first (refractive) light spot 116 on the front side of the sphere 102 and a second (specular) light spot 116' both of which disturb the measurement. In other words, in outdoor application the rear focus creates very bright spots 116 and 116' when the sun is on the opposite side of the sphere 102.

FIG. 10b illustrate the effect of such direct ambient light on the surveying image sensor and hence the measurement signal or surveying image 120, particularly for ambient light impinging with a low elevation such as 45° or below and for long measurement range such as 50 m or more.

In the middle part of FIG. 10b, there is shown an image 120 generated by an image sensor when there is no surveying light or target sphere illumination (LED off). Because of the present ambient light focused on the front hemisphere, there is a light spot 121 present on the image 120.

In the upper part of FIG. 10b, there is shown an image 120' of the image sensor when the sphere is illuminated by surveying light or by an own illumination source (LED on) in addition to the present direct ambient light. The surveying light leads to a further light spot 122. However, this surveying light spot 122 is hardly distinguishable from the light spot 118 from the ambient light spot 121 even in case of a differential image 20d (image 121 subtracted from image 122) as shown at the bottom of FIG. 10b, too. The signal-to-noise ratio is rather low and the measurement error accordingly high. The position of the retroreflector resp. of the target point can only be determined with low accuracy if at all.

Figures 11A, 11B:
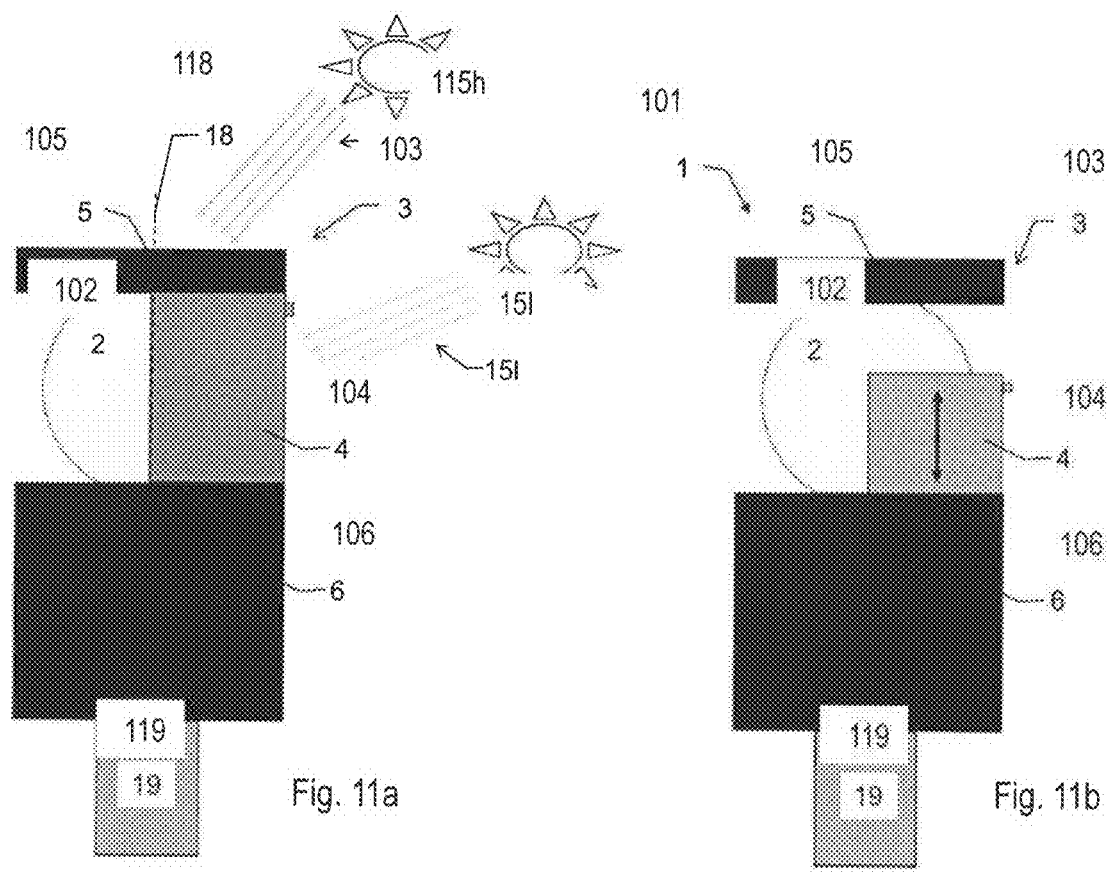
FIGS. 11a-b illustrate a first example of a surveying spherical retroreflector with a light shielding.

FIGS. 11a and 11b illustrate a first example of a surveying spherical retroreflector 101 according to the invention. The retroreflector 101 comprises a retroreflective sphere 102 as described above. The sphere 102 is mounted to a surveying rod 119. Further, the retroreflector 101 comprises a light shielding 103. The light shielding 103 is designed such that it protects the sphere 102 against direct ambient light and by having a special side shielding 104 specifically against direct ambient light impinging with low elevation ("from the side").

Therefore, the shielding 103 in the example comprises a side shielding 104 which is embodied as a hollow half cylinder, mounted to a support 106 on pole 119. The axis of half cylinder 104 coincidences with the horizontal axis 118 of sphere 102. The half cylinder 104 extends (nearly) over the whole diameter of the sphere 102 and thus protects the sphere from incoming low elevation direct ambient light 151. Instead of running over 180°, it may be sufficient protection against side light to mount a cylinder of e.g. 150° which enables a larger surveying window (acceptance angle for the surveying beam).

Thus, the retroreflector 1 comprises a side sun shade 104 which protects the back hemisphere ("back" with respect to the orientation to the surveying instrument) from ambient light 151. As no (direct) ambient sun light impinges on the back side of sphere 102, no sun spot as described in FIGS. 9a and 10a,b is present which could superimpose with the retroreflected light and disturb the surveying.

In addition to said side shielding 104, the shielding 103 in the example comprise a top shielding 105. The shielding "hat" blocks sun rays 115h at high elevation and in addition blocks specular reflections (as described with respect to FIG. 9c). Depending on the required pitch range of the reflector 101, this hat 105 can be made larger to block a larger range of sun elevations. In addition in the example, it is designed to serve as protection against mechanical interference, e.g. impacts, wherefore the top shielding 105 is made from a hard material or relatively thick.

As another option depicted in the example according to FIG. 11b, the side shielding 104 is retractable (indicated by the arrow). It can be lowered (moved into support 119), either manually or by a motor situated in support 106. To the contrary, the top shielding 105 is fixedly mounted to sphere 102.

Such a light shade 104 which can be slid up when needed is advantageous as the 360°-availability or usability of the sphere 102 resp. the retroreflector 101 has only to be restricted if direct ambient light is indeed present. If no protection is needed, e.g. no direct (low) sun light is present or if using the retroreflector 101 for surveying in buildings or tunnels or the like, the side shielding 104 can be retracted and the retroreflector 101 can be targeted with the surveying beam from any horizontal angle. Thus, the initial advantage of a spherical retroreflector, its (seemless) 360° or outright usability can be reestablished if the circumstances allow it.

Such an evaluation of circumstances is optionally done automatically. For example, the retroreflector 101 comprises a light detector for detection of direct ambient light. If no (or only weak) direct ambient light is detected, the side shielding 104 is automatically retracted. As another option, if it is detected that no surveying beam hits the sphere 102, the shade 104 is retracted, e.g. partly retraced by moving it up such that it only covers 25% or 40% of the upper half of the sphere 102. The detection if surveying light hits sphere 102 or not is e.g. done by the surveying instrument, e.g. if no retroreflected beam is detected the surveying instrument wirelessly orders the retroreflector 101 to open side shielding 104, for instance horizontally as shown in FIG. 11b or vertically (retraction by contraction).

Instead or in addition to shielding retracting, i.e. altering the size of the open window, shielding 104 or the complete shielding 105 can optionally be rotated around the sphere 102, e.g. about north-south-axis 118, either manually or automatically as described above. Thus, not or not only the size of the window open to impinging light is altered, but its orientation. This is further explained with respect to following FIGS. 12a and 12b.

Figures 12A, 12B:
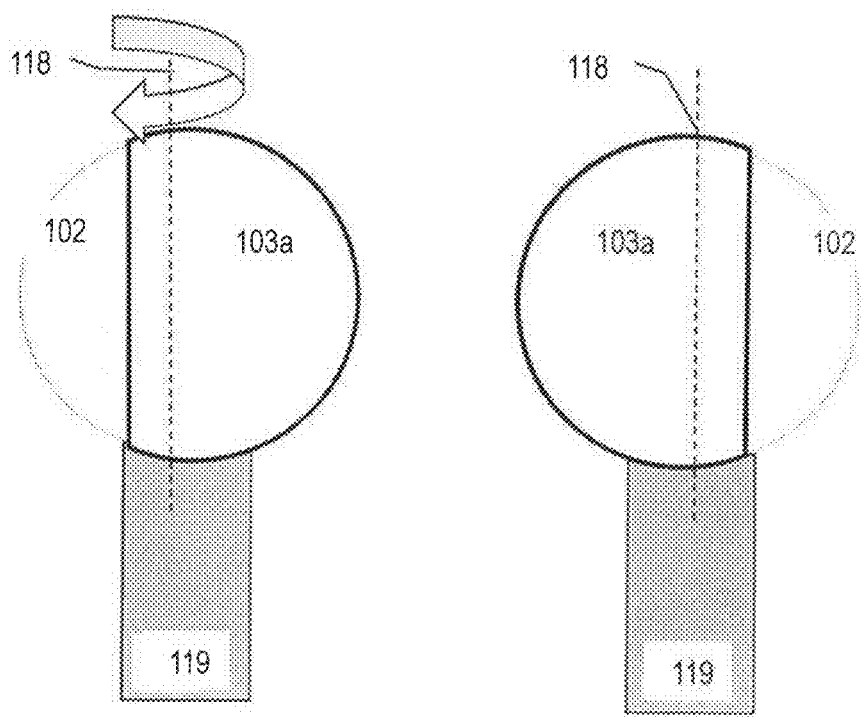
FIGS. 12a-b depicts another example of a retroreflector comprising a light shielding.

FIGS. 12a and 12b show another example of a light shielding. The light shielding is embodied a sphere-like hollow structure 103a, in the example with a size a little more than a half-sphere. The shielding 103a has a diameter comparable to the diameter of the retroreflective sphere 102 such that it jackets at least one north-south hemisphere of the retroreflective sphere 102. Thus, the shielding 103a shields the back side of sphere 102 as well as the main part of its left and right side and top and bottom.

The size or circumference, particularly its extension in the equatorial plane of sphere 102, can be chosen dependent on the environmental conditions. As another option, as shown in the Figures, the shielding 103a is designed such that it is freely rotatable about the north-south-axis 118, indicated by the arrow in FIG. 12a. Thus, for example a 180°-rotation about this vertical axis 118 can be effected as shown from FIG. 12a to FIG. 12b, either manually or motorized (automatically).

In addition to such a rotation about vertical axis 118, the shielding 103a is optionally rotatable about the horizontal axis resp. (nearly) completely rotatable around sphere 102 in all directions. Thus, any desired orientation of the shielding 103a and thus the "field of view" of sphere 102 can be set. A vertical orientation (as shown in FIGS. 12a,b) can optionally be automatically effected using gravity, which can be helpful for surveying with pole 119 not oriented vertical (surveying poles 119 with determination of its orientation are known in the art). Thus, shielding 103a automatically mainly acts as a side shielding no matter in which orientation the reflector 101 is held as it remains oriented as shown in the Figures even if pole 119 is not vertically positioned.

FIGS. 13a and 13c show another example of retroreflector 101 with an ambient light shielding 103. FIG. 13b is a retroreflector without such a light shield for comparison.

FIG. 13a shows a 3D-view of a retroreflector 101 with a light shielding. The shielding 3b comprises a top shade 105 and a side shielding 107. The side shielding 107 comprises a plurality of fins 108, arranged successively around sphere 102 perpendicular to its equatorial plane and spaced equally to each other as a cylinder around the sphere. The visible area of sphere 102 is reduced to a small area in the center, whereby the shielding 107 is designed such that this area corresponds to the cross-section of the retroreflection of the surveying beam. For comparison and better conception, FIG. 13b illustrates the "naked" sphere 102 without the side shielding 107.

The ring 107 of radial fins 108 limits the angular acceptance range of incoming light beams and thus shields from direct ambient light. In this way the structure acts like a kind of bended jalousie around the sphere. This is further illustrated with FIG. 13c which is a cross-sectional view of retroreflector 101 in the equatorial plane. In the middle, there is sphere 102 with the series of discrete fins 108 around.

FIG. 13c illustrates that an incoming surveying beam 110, which impinges at least roughly radially or perpendicular to the sphere's surface is not hindered and can enter the sphere 102 and be retroreflected subsequently. To the contrary, ambient light beam 115 impinging with low angle as indicated in FIG. 13c is blocked by one of the fins 108 and does not penetrate onto or into sphere 102.

As an in principle similar alternative to such fins, a shielding with a structure for limiting the angular acceptance range is embodied as holes distributed over the sphere 102 and pointing towards the centre of the sphere 102 whereby the ratio of diameter and length of the holes define the acceptance angle. For example, the structure is embodied as a shielding shell with holes in it whereby the relation between diameter and shell thickness gives the acceptance angle of the sphere. This provides the advantage that elevation and azimuth angles beyond a given range are blocked.

An advantage of such shielding with fins or holes around the sphere 102 is that the shielding effect is the same regardless of the horizontal orientation of sphere 102 (note the symmetry as best viewed in FIG. 13c). Said otherwise, the shielding 103b is rotation invariant with respect to the vertical or north-south axis. Thus, there is no need for an operator to mind or adjust the yaw angle when the retroreflector 101 is positioned at a target point to be surveyed.

Figure 14A:
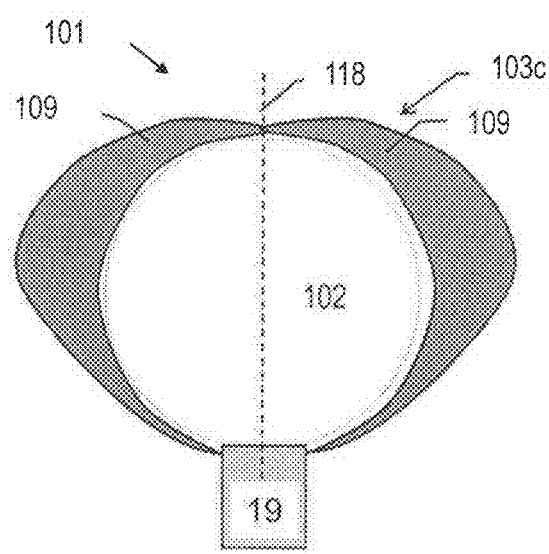
FIGS. 14a-b illustrate another embodiment of a retroreflector with a shielding limiting the angular acceptance range.
Figure 14B:
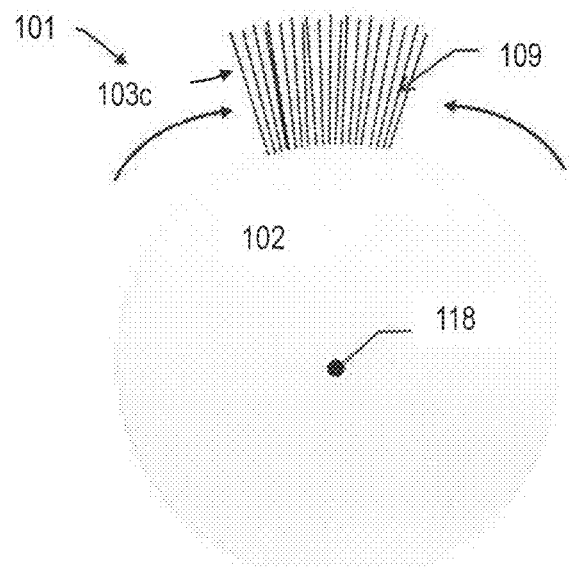

FIGS. 14a and 14b illustrate another embodiment of a retroreflector 101 with a shielding 103c limiting the angular acceptance range.

FIG. 14a is a simplified side view, showing sphere 102 mounted on some sort of support 119. The sphere 102 is 360° in the equatorial plane surrounded by radial fins 109 whereby in the Figure for better illustration only two fins 109 on each side are depicted. In contrast to the example according to FIGS. 13a and 13c, the fins 109 run (nearly) completely from the north "pole" to the south "pole" along the lines of longitude. There is no separate top shielding and side shielding as in the example according to FIGS. 13a and 13c but the fins 109 serve both as top shielding and side shielding.

FIG. 14b illustrates in a simplified top view a further development of the embodiment according to FIG. 14a. The fins 109 are only adumbrated, not drawn completely around the sphere 102 in north-south direction. Shown is that the shielding 103c is retractable in that it can be folded together (indicated by the arrows). Said otherwise, the fins 109 can be slid about the horizontal axis 118 so that only a certain part of sphere 102 is covered, e.g. only half of the sphere 102 or only some minor rest at a back side as shown in FIG. 14b.

Such a shielding 103c retractable by movable fins 109 can generally be used to increase or decrease the effective size of shielding 103c to provide the advantages mentioned above with respect to FIGS. 11a-12b, that is also in an embodiment such as shown in FIG. 13a or 13c. In addition, a variable or modifiable shielding structure 103c can be used to alter the angular acceptance range of the shielding 103, e.g. by changing the distance between some or all fins 109 or changing their positioning angle (e.g. slightly tilting them towards the sphere's surface).

Figure 15:
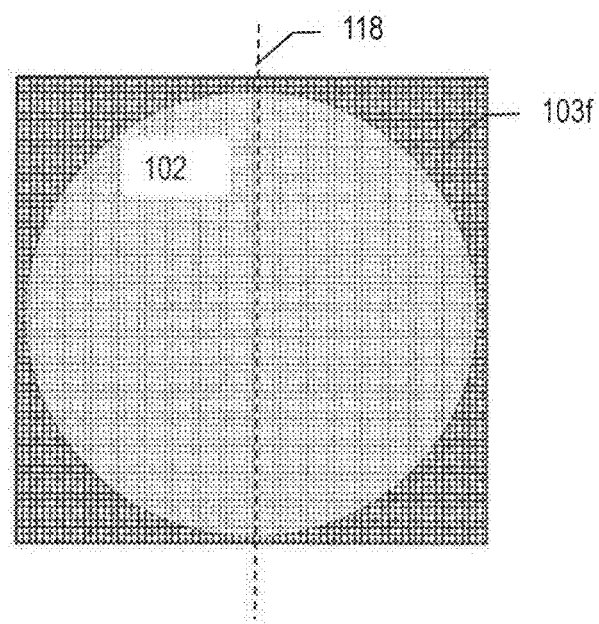
FIG. 15 illustrates another embodiment of a retroreflector with a shielding limiting the angular acceptance range.

FIG. 15 depicts an alternative to the embodiments shown in FIGS. 13a-14b with discrete fins 108, 109. In the example, a shielding structure 103f limiting the angular acceptance range is embodied as a structured film, foil, or thin sheet with a forming die, lying around sphere 102. Such a film 103f is for example arranged as a hollow cylinder with its axis coaxial to the north-south axis 118 of sphere 102, as shown in FIG. 15.

Figure 16A:
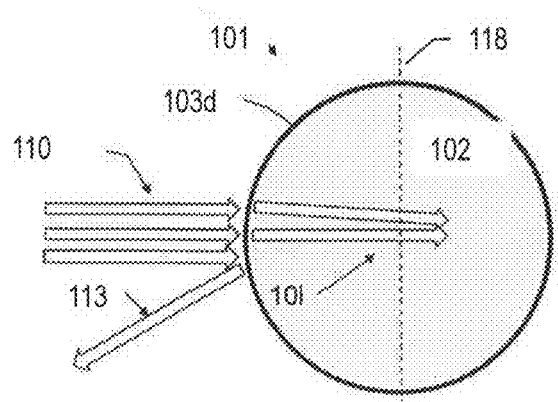
FIGS. 16a-b illustrate another example of a shielding against direct ambient light.
Figure 16B:
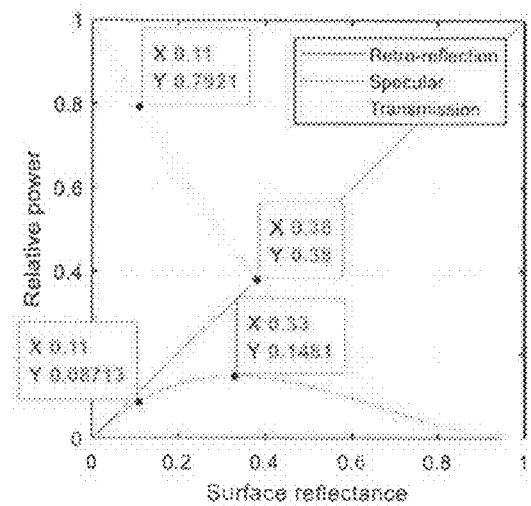

FIGS. 16a and 16b illustrate another example of a shielding against direct ambient light.

As shown in side-view FIG. 15a, the exemplary shielding is embodied as a reflective coating 103d on sphere 102. The coating 103d covers in the FIG. 15a the complete sphere 102, however, as an alternative the coating 103d functions only as a side shielding and extends only about the equator of sphere 102 e.g. half the diameter to north and south pole or asymmetrically up to 70° latitude to north and 45° latitude south. Such a coating is as another option not applied to the surface of the sphere 102 but to the inner surface of a hollow shielding structure such as shielding 103a shown in FIG. 12a.

Or as another alternative, the coating 103d has a reflectivity of (substantially) 100% and accordingly covers only one hemisphere (the "back" hemisphere) or part of it (see also FIGS. 16a, 16b). Thus, such a shielding 103d, for example embodied as a metal coating (e.g. aluminium, copper) blocks all light from "behind" sphere 102.

However, as said and indicated in the example, the coating 103d preferably runs about the whole surface of the sphere 102 (which has the advantage that the orientation of the sphere 102 towards the geodetic instrument is of no importance which facilitates handling by an operator or enables targeting of retroreflector 101 from any direction) and has reflectivity in between 25% and 45%, for example 33%. Thus, as schematically indicated, by this "semi"-reflective coating part of incoming surveying beam 113 is reflected at the surface (light arrow 113) which means a higher loss by specular reflection than without coating 103d but the part of surveying light 110i which has entered sphere 102 and is reflected at its back side is increased compared to a "naked" sphere as shown e.g. in FIG. 9a, resulting in the end a higher yield and a higher SNR as more ambient direct light is blocked than without shielding 103d.

FIG. 16b shows that best margin is obtained for a reflectivity of coating 103d of 33%. Said otherwise, maximum measurement signal strength is obtained at surface reflectance R=33% at which the retro-reflection is 70% stronger and a sun focus spot (transmission of direct ambient light) is reduced by 43% for a total of 3× better signal to disturbance ratio. At R=38%, the specular and transmission coefficients are equal, so an ideal surface reflectance of coating 3d could be in the range 33%-38%. Such a partly reflective shielding 3d is beneficial in that it increases the retro-reflection strength and at the same time reduces the transmitted ambient light.

Figure 17A:
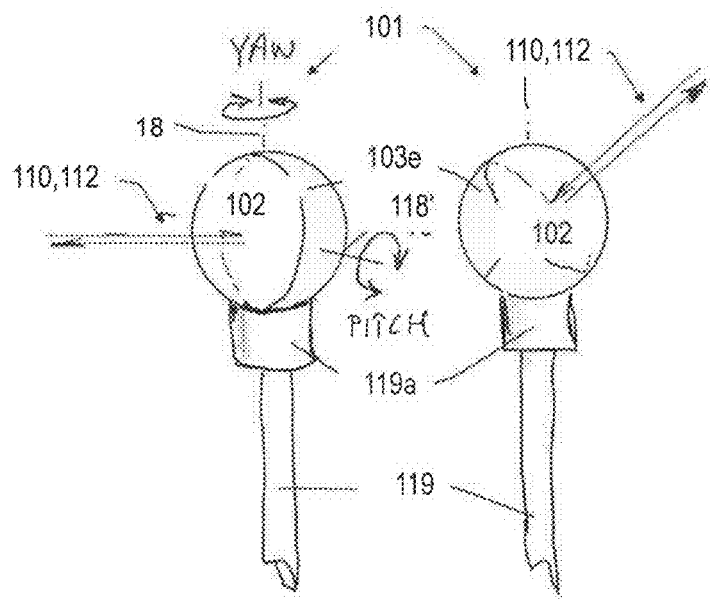
FIGS. 17a-b illustrate still another example of a shielding against direct ambient light.

FIGS. 17a,b illustrate an embodiment of a retroreflector 101 wherein the sphere 102 has a 100% reflective coating 103e as shielding. Due to the reflective coating, incoming surveying light 110 can enter sphere 102 unhindered by the shielding and is reflected at its back side with a higher degree compared to a "naked" sphere as beam 112 whereby ambient light from the back is blocked. The shielding 103e, e.g. a metal coating, is fixedly attached to sphere 102.

The sphere 102 itself is mounted to a pole 119. In the example, the sphere 102 is mounted at an interface 119a of pole 119 in such a way, that it is rotatable about two axes. That is, yaw and pitch angle of sphere 102 can be changed as is illustrated by the two different poses in FIG. 16a. Preferably, the sphere 102 can be rotated by a drive unit, e.g. integrated in interface 119a, for instance a piezoelectric drive as described with respect to FIG. 117b.

Figure 17B:
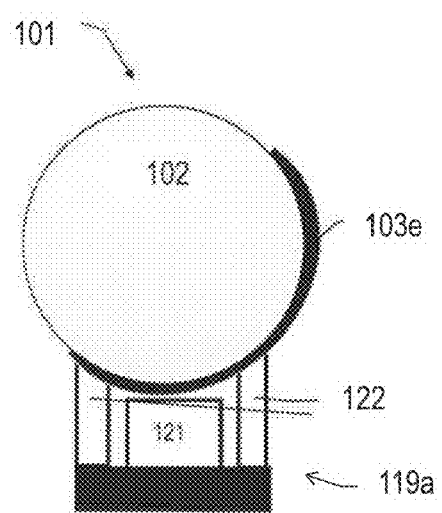

FIG. 17b is a cross sectional view of retroreflector 101 with sphere 102 and ferromagnetic metal coating 103e. The sphere 102 is mounted on pole interface 119a. The interface 119a comprises a piezoelectric cylinder 122 with three zones of electrodes (not shown) whereby the sphere 102 lies with its coating 103e on the cylinder 122 with friction pads in between them (not depicted). Due to the presence of a permanent magnet 121 in the middle, by accordingly controlling the electrodes, the sphere 102 can be rotated—as shown in FIG. 17a—by force exertion onto ferromagnetic coating 3e attached to sphere 1102.

As an alternative drive (not shown), the retroreflector comprises a spherical ultrasonic motor. Such an exemplary spherical ultrasonic motor comprises an actuator driven by mechanical vibration in an ultrasonic field. The ultrasonic motor comprises a rotor and a stator, and piezoelectric elements are attached to a metal elastic body in the stator. According to the driving principle of the ultrasonic motor, it can be driven by the contact between the stator vibration surface and the part of the rotor, so rotational motion can be realized by simple mechanism.

As an alternative to said coatings, the shielding comprises as a filtering coating. Preferably, the shielding comprises a band-pass filter centered at the wavelength of the surveying light. For example, the shielding is embodied as layer of red "paint" or foil on the surface of sphere 102.

A skilled person is aware of the fact that details, which are here shown and explained with respect to different embodiments, can also be combined in other permutations in the sense of the invention if not indicated otherwise.

What is claimed:
1. A reflector arrangement for determining the position or marking of target points for industrial or geodetic surveying, the reflector arrangement comprising:
   one retroreflector, which provides a position determination for the reflector arrangement by means of parallel or coaxial, measurement beam reflection, provides a passage surface for at least a part of measurement radiation entering the retroreflector as orientation measurement radiation, and provides a reflector field of view having a first aperture angle around a yaw axis and a second aperture angle around a pitch axis orthogonal to the yaw axis, and a beam detection unit, by means of which the orientation measurement radiation passing through the retroreflector is acquirable, wherein a spatial orientation of the reflector arrangement is at least partially definable with the aid of an orientation of a body-intrinsic coordinate system defined by at least the yaw axis in relation to an external coordinate system at least with the aid of a relative yaw angle, wherein the yaw angle specifies a rotational alignment of the reflector arrangement around the yaw axis, wherein the beam detection unit comprises a first sensor for generating a signal in dependence on an acquisition of orientation measurement radiation and a first beam guiding unit, wherein the first sensor and the first beam guiding unit are arranged in such a way that a detection field of view for acquiring the orientation measurement radiation is defined by an interaction of the beam guiding unit and the sensor, which field of view has an aperture angle around the yaw axis which is less than the first aperture angle of the reflector field of view, an alignment of the detection field of view around the yaw axis is variable by means of a pivot or rotation of the beam guiding unit around the yaw axis, and orientation measurement radiation passing through the retroreflector is acquirable in dependence on the alignment of the detection field of view using the first sensor, wherein the first beam guiding unit defines a rotational axis, aligned coaxially or in parallel to the yaw axis, wherein the beam guiding unit is rotatably mounted around the rotational axis for variation of the alignment of the detection field of view and provides a rotation-angle-dependent acquisition of the orientation measurement radiation.

2. The reflector arrangement according to claim 1, wherein the beam guiding unit comprises at least one beam passage, which beam passage is embodied as an oblong aperture arranged extending in parallel to the yaw axis or is slotted.

3. The reflector arrangement according to claim 1, wherein the reflector arrangement or the beam guiding unit comprises a beam deflector designed and arranged for deflecting and/or focusing the radiation onto the first sensor, said radiation passing through the passage surface.

4. The reflector arrangement according to claim 1, wherein the first sensor is designed for generating the signal:
depending on a detection of the orientation measurement radiation, or
depending on an intensity of orientation measurement radiation incident on the first sensor.

5. The reflector arrangement according to claim 1, further comprising:
a drive unit, which provides a controlled pivot and/or rotation of the beam guiding unit around the rotational axis or yaw axis; or an encoder unit, which is designed to acquire the alignment of the detection field of view, wherein the encoder unit is coupled to the beam guiding unit, the drive unit, or the rotational axis.

6. The reflector arrangement according to claim 1, further comprising an analysis unit configured to determine the alignment of the detection field of view in dependence on a signal from the first sensor, wherein the analysis unit is configured such that:
a. by means of the first sensor, an intensity-dependent signal curve is acquirable or during a rotation of the beam guiding unit, a signal intensity is determinable or storable depending on a respective yaw alignment of the beam guiding unit,
b. the yaw angle is derivable based on the determination of the alignment of the detection field of view, or
c. a pitch angle is derivable based on a time or rotation-angle-related distance of two measurement signal acquisitions during a rotation of the beam guiding unit of less than 360°.

7. The reflector arrangement according to claim 1, wherein the retroreflector is designed as a prism, and the prism comprises:
i. a light entry surface forming a polygon, and
ii. the passage surface opposite to the light entry surface as an aperture,
wherein:
the passage surface is formed at a corner of the prism, wherein the passage surface is formed by an omitted corner of the prism and also defines a polygon, or
the retroreflector defines an optical axis, wherein the optical axis extends orthogonally to the passage surface or intersects the center point of the passage surface.

8. The reflector arrangement according to claim 7, being designed as a 360° retroreflector having a plurality of retroreflectors which adjoin one another, wherein:
i. the plurality of the prisms are arranged in a ring shape, and
ii. the 360° retroreflector defines an overall field of view around the yaw axis of 360°, wherein the optical axes of at least two prisms have a shared point of intersection with the yaw axis.

9. The reflector arrangement according to claim 8, wherein the plurality of the retroreflectors is arranged such that:
a. the reflector arrangement comprises a central outlet, wherein the yaw axis extends centrally through the outlet,
b. the beam detection unit is at least partially arranged in the outlet, and
c. the beam detection unit is designed for angle-of-incidence- dependent acquisition of the orientation measurement radiation passing through an arbitrary one of the passage surfaces of the retroreflectors over the overall field of view of 360°.

10. The reflector arrangement according to claim 1, wherein the beam detection unit comprises a second beam guiding unit and a second sensor, wherein the first beam guiding unit is associated with a first prism group and the second beam guiding unit is associated with a second prism group, wherein:
a. the first and the second prism groups each comprise three prisms, or
b. the first and the second beam guiding unit are arranged in the outlet.

11. The reflector arrangement according to claim 10, wherein:

a. the first prism group and the first beam guiding unit provide an acquisition of the orientation measurement radiation, which can be provided by the first prism group and is projectable by means of the first beam guiding unit on the first sensor, by the first sensor,
b. the second prism group and the second beam guiding unit provide an acquisition of the orientation measurement radiation, which can be provided by the second prism group and is projectable by means of the second beam guiding unit on the second sensor, by the second sensor, and
c. the center points of the passage surfaces of the prisms of the first prism group are in a first plane, the center points of the passage surfaces of the prisms of the second prism group are in a second plane and the first plane and the second plane are aligned in parallel to one another and have a defined distance, wherein the planes are substantially orthogonal to the yaw axis or the prisms of the first prism group and prisms of the second prism group are tilted oppositely in relation to a plane aligned orthogonally to the yaw axis.

12. The reflector arrangement according to claim 1, wherein the beam detection unit comprises a second beam guiding unit and a second sensor, and wherein:
a. both the first and also the second beam guiding unit are arranged and designed for the angle-of-incidence-dependent acquisition of the orientation measurement radiation passing through an arbitrary one of the passage surfaces of the retroreflectors over the overall field of view of 360°,
b. the first and the second beam guiding unit each comprise a beam deflection means and each comprise a slotted beam passage, wherein
  i. both the first and the second beam deflection means and also the first and the second slotted beam passage are arranged and aligned at a yaw distance of in each case 180° in relation to one another,
  ii. a slot extension axis defined by the respective slotted beam passage is tilted with respect to the yaw axis around an axis parallel or coaxial to a roll axis, in particular by an angle from an angle range of 30° to 60°, wherein the roll axis is aligned orthogonally to both the yaw axis and also the pitch axis,
  iii. an alignment of the beam deflection means resulting due to a projection of the respective beam deflection means on a plane defined by the yaw axis and pitch axis is tilted with respect to the yaw axis around the axis parallel or coaxial to the roll axis,
  iv. the tilts of the first beam passage and of the first beam deflection means are identical in absolute value and direction, and
  v. the tilts of the second beam passage and of the second beam deflection means are identical in absolute value and direction,
c. wherein the tilts of the first and second beam passage and of the first and second beam deflection means are identical at least with respect to direction around the axis parallel or coaxial to the roll axis.

13. A measurement aid instrument having a reflector arrangement according to claim 1, wherein the measurement aid instrument is designed for the contactless or tactile acquisition of a target point on an object having defined position relationship to the reflector arrangement.

14. A surveying spherical retroreflector for retroreflection of incoming surveying light, the surveying spherical retroreflector comprising:
a transparent, retroreflective sphere with a defined equatorial plane; and
a light shielding designed as shielding of the sphere against direct ambient or solar irradiation,
wherein the shielding comprises a structure limiting the angular acceptance range of impinging light beams, wherein the structure comprises:
a plurality of discrete fins running circumferentially around the sphere and perpendicular to the equatorial plane of the sphere or a plane having a center point of the sphere,
a structured film, arranged as a hollow cylinder coaxial to the north-south-axis of the sphere, and
a plurality of holes running circumferentially around the sphere,
wherein the holes are pointing towards the center of the sphere and the relation of hole diameter to the hole length defines the acceptance angle.

15. The surveying spherical retroreflector according to claim 14, wherein the shielding comprises a side shielding, designed as shielding against ambient light beams impinging with an incidence angle of maximal 60° with respect to the equatorial plane.

16. The surveying spherical retroreflector according to claim 15, wherein the side shielding:
extends 360° around the north-south-axis of the sphere or
is embodied as a hollow structure running substantially around a north-to-south hemisphere of the sphere.

17. The surveying spherical retroreflector according to claim 14, wherein the shielding comprises:
a reflective coating extending 360° around the north-south-axis of the sphere and has a reflectivity in between 25% and 45%,
a reflective coating extending 180° at most around the north-south-axis of the sphere and has a near-total-reflectivity, or
a band-pass light filter coating adapted to the wavelength of the surveying light.

18. A surveying spherical retroreflector for retroreflection of incoming surveying light, the surveying spherical retroreflector comprising:
a transparent, retroreflective sphere with a defined equatorial plane; and
a light shielding designed as shielding of the sphere against direct ambient or solar irradiation, wherein at least part of the shielding is:
at least partly retractable,
rotatable about at least one axis relative to the sphere, or
fixed relative to the sphere, wherein the sphere is rotatable about at least one axis, wherein the retraction or rotation is effected automatically, dependent on a detection of direct ambient light or of the surveying light.

* * * * *